US012348376B2

(12) United States Patent
Liu et al.

(10) Patent No.: US 12,348,376 B2
(45) Date of Patent: Jul. 1, 2025

(54) CONNECTION CONFIGURATION METHOD AND APPARATUS

(71) Applicant: HUAWEI TECHNOLOGIES CO., LTD., Guangdong (CN)

(72) Inventors: Hang Liu, Beijing (CN); Changqing Yang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 23 days.

(21) Appl. No.: 18/475,036

(22) Filed: Sep. 26, 2023

(65) Prior Publication Data
US 2024/0015073 A1 Jan. 11, 2024

Related U.S. Application Data

(63) Continuation of application No. PCT/CN2021/083521, filed on Mar. 29, 2021.

(51) Int. Cl.
*G06F 15/173* (2006.01)
*H04L 41/0803* (2022.01)
*H04L 41/12* (2022.01)

(52) U.S. Cl.
CPC .......... *H04L 41/12* (2013.01); *H04L 41/0803* (2013.01)

(58) Field of Classification Search
CPC . H04L 41/12; H04L 41/0803; H04L 12/2809; H04L 41/0806; H04L 41/22
See application file for complete search history.

(56) References Cited

U.S. PATENT DOCUMENTS

| | | | | |
|---|---|---|---|---|
| 2010/0262467 A1* | 10/2010 | Barnhill, Jr. | ........ | H04L 41/0253 707/E17.057 |
| 2011/0280156 A1 | 11/2011 | Jing et al. | | |
| 2016/0294630 A1 | 10/2016 | Verma et al. | | |
| 2019/0158975 A1* | 5/2019 | Petersen | ................. | H04W 4/70 |
| 2023/0370814 A1* | 11/2023 | Fu | .......................... | H04W 4/33 |

FOREIGN PATENT DOCUMENTS

| | | |
|---|---|---|
| CN | 108206784 A | 6/2018 |
| CN | 111817935 A | 10/2020 |
| CN | 112039693 A | 12/2020 |
| EP | 3273637 A1 | 1/2018 |

* cited by examiner

*Primary Examiner* — John B Walsh
(74) *Attorney, Agent, or Firm* — WOMBLE BOND DICKINSON (US) LLP

(57) ABSTRACT

Embodiments of this disclosure provide a connection configuration method and apparatus, and relate to the field of communication technologies. The method includes: obtaining device information of at least one second device; and generating topology information based on the device information of the at least one second device, where the topology information indicates a connection relationship between a first device and the at least one second device or a connection relationship between the at least one second device, and the connection relationship indicates a priority of a device and/or a master-slave relationship between devices. In this way, efficiency and convenience of connection configuration of a plurality of short-distance devices can be improved.

19 Claims, 16 Drawing Sheets

CONNECTION CONFIGURATION METHOD AND APPARATUS

CROSS-REFERENCE TO RELATED APPLICATIONS

This application is a continuation of International Application No. PCT/CN2021/083521, filed on Mar. 29, 2021, the disclosure of which is hereby incorporated by reference in its entirety.

TECHNICAL FIELD

This application relates to the field of communication technologies, and in particular, to a connection configuration method and apparatus.

BACKGROUND

Connections between smart devices greatly enrich people's daily life. For example, in a smart home environment, a smartphone of a user may be connected to a home device such as a smart refrigerator, a smart vacuum cleaner, or a smart sound box, and the smartphone is used to implement management, control, and data transmission for another home device in the connection.

A connection between a smartphone and a smart sound box is used as an example. Usually, a quick-response (QR) code needs to be scanned on the smartphone, or information such as a verification code corresponding to the smart sound box needs to be entered, to implement the connection between the smartphone and the smart sound box. The QR code or the verification code may be information such as a QR code or a character string printed on a body of the smart sound box. Short-distance communication between devices provides great convenience for people's life. As a quantity of terminal devices around a user increases in the field such as a home environment, multi-device management and connection become more complex.

In conclusion, configuration of a connection relationship between the foregoing devices has a cumbersome process, a complex operation, and low efficiency.

SUMMARY

Embodiments of this application relates to the field of communication technologies, and provide a connection configuration method and apparatus, to implement connection configuration of a plurality of short-distance devices. The method is simple and efficient.

According to a first aspect, an embodiment of this application provides a connection configuration method, including: obtaining device information of at least one second device; and generating topology information based on the device information of the at least one second device, where the topology information indicates a connection relationship between a first device and the at least one second device or a connection relationship between the at least one second device, and the connection relationship indicates a priority of a device and/or a master-slave relationship between devices. The generated topology information herein may be referred to as first topology information.

Further, the method includes: sending all or some information in the first topology information, or sending information indicating or representing all or some information in the first topology information, where the information also indicates the connection relationship between the first device and the at least one second device or the connection relationship between the at least one second device. The information sent herein may be referred to as second topology information, and the second topology information may be the same as or different from the first topology information.

This can resolve a cumbersome process of performing one-to-one device configuration in an existing manner, and simplify a connection configuration process between a plurality of devices, and the method is simple and efficient.

In some embodiments, the connection relationship is related to at least one service. In this way, based on different services, connection relationships adapted to the services can be established.

In some embodiments, the generating topology information includes: generating the topology information based on input information from a user, where the input information includes drawing information or configuration information, the drawing information is obtained based on a drawing operation from the user on a connection line between the first device and the at least one second device or a connection line between the at least one second device, and the configuration information is obtained based on a configuration operation from the user on an attribute of the first device and the at least one second device or an attribute of the at least one second device. In this way, flexible configuration of the topology information can be implemented, and then a network can be constructed based on the topology information, so that efficient communication between devices can be implemented based on the network.

In some embodiments, the generating topology information includes: outputting at least one piece of prompt information; and generating the topology information based on information in response to the prompt information, where the information in response to the prompt information is from a user and is used to establish the connection relationship between the first device and the at least one second device or establish the connection relationship between the at least one second device. In this way, flexible configuration of the topology information can be implemented, and then a network can be constructed based on the topology information, so that efficient communication between devices can be implemented based on the network.

In some embodiments, the generating topology information includes: generating the topology information in response to a location change of a device identifier displayed in an interface, where the device identifier is used to identify a device. In this way, flexible configuration of the topology information can be implemented, and then a network can be constructed based on the topology information, so that efficient communication between devices can be implemented based on the network.

In some embodiments, the method further includes: displaying a topology structure, where the topology structure includes the connection relationship. In this way, the connection relationship between devices can be viewed more intuitively.

In some embodiments, the topology structure further includes a relative distance and/or a relative orientation between devices; and a length of a connection line used to reflect the connection relationship is positively correlated with the relative distance, and/or a parameter of a distance between the devices corresponding to the connection relationship is marked on the connection line used to reflect the connection relationship. In this way, a more accurate topology structure can be displayed based on the relative distance and/or the relative orientation.

In some embodiments, the obtaining device information of at least one second device includes: sending a query request, where the query request includes identity information of the first device; and receiving the device information from the at least one second device, where the identity information of the first device is used to identify the first device. In this way, the first device may obtain the device information of the second device based on the query request, and may further generate, based on different device information of devices, topology information corresponding to the device information of the devices.

In some embodiments, the device information of the second device is carried in a random access request or a response message. In this way, the first device may alternatively obtain the device information of the second device based on the random access request or the response message, and may further generate, based on different device information of devices, topology information corresponding to the device information of the devices.

In some embodiments, the device information includes one or more of the following: a device identifier, identity information, a device hardware address, or a device domain name.

In some embodiments, the query request further includes one or more of the following: a security key parameter or information indicating that the first device is a master node.

According to a second aspect, an embodiment of this application provides a connection configuration method, including: sending device information of a second device; and receiving topology information from a first device, where the topology information includes a connection relationship between the first device and at least one second device or a connection relationship between at least one second device, and the connection relationship indicates a priority of a device and/or a master-slave relationship between devices. The received topology information herein may be the foregoing second topology information, the second topology information may include all or some information in first topology information, or information indicating or representing all or some information in the first topology information.

This can resolve a cumbersome process of performing one-to-one device configuration in an existing manner, and simplify a connection configuration process between a plurality of devices, and the method is simple and efficient.

In some embodiments, the sending device information of a second device includes: receiving a query request from the first device, where the query request includes identity information of the first device; and sending the device information of the second device to the first device based on the query request. In this way, the first device may obtain the device information of the second device based on the query request, and may further generate, based on different device information of devices, topology information corresponding to the device information of the devices.

In some embodiments, the device information of the second device is carried in a random access request or a response message. In this way, the first device may alternatively obtain the device information of the second device based on the random access request or the response message, and may further generate, based on different device information of devices, topology information corresponding to the device information of the devices.

In some embodiments, the device information includes one or more of the following: a device identifier, identity information, a device hardware address, or a device domain name.

In some embodiments, the query request further includes one or more of the following: a security key parameter or information indicating that the first device is a master node.

According to a third aspect, an embodiment of this application provides a connection configuration apparatus. The connection configuration apparatus may be a first device, or may be a chip or a chip system in the first device. The connection configuration apparatus includes at least one of a display unit, a processor, and a communication processor. When the connection configuration apparatus is the first device, the communication processor may be a communication interface or an interface circuit. The communication processor is configured to perform an operation of communicating with a second device, so that the first device implements the connection configuration method according to any one of the first aspect or the embodiments of the first aspect. When the connection configuration apparatus is the first device, the display unit may be a display. The display unit is configured to perform a display operation, so that the first device implements the connection configuration method according to any one of the first aspect or the embodiments of the first aspect. When the connection configuration apparatus is the first device, the processor may be a processor. The connection configuration apparatus may further include a storage unit, and the storage unit may be a memory. The storage unit is configured to store instructions, and the processor executes the instructions stored in the storage unit, so that the first device implements the connection configuration method according to any one of the first aspect or the embodiments of the first aspect. When the connection configuration apparatus is the chip or the chip system in the first device, the processor may be a processor. The processor executes the instructions stored in the storage unit, so that the first device implements the connection configuration method according to any one of the first aspect or the embodiments of the first aspect. The storage unit may be a storage unit (for example, a register or a cache) in the chip, or may be a storage unit (for example, a read-only memory or a random access memory) that is in the first device and that is located outside the chip.

For example, the processor is configured to obtain device information of at least one second device; and the processor is further configured to generate topology information based on the device information of the at least one second device, where the topology information indicates a connection relationship between a first device and the at least one second device or a connection relationship between the at least one second device, and the connection relationship indicates a priority of a device and/or a master-slave relationship between devices.

In some embodiments, the connection relationship is related to at least one service.

In some embodiments, the processor is configured to generate the topology information based on input information from a user, where the input information includes drawing information or configuration information, the drawing information is obtained based on a drawing operation from the user on a connection line between the first device and the at least one second device or a connection line between the at least one second device, and the configuration information is obtained based on a configuration operation from the user on an attribute of the first device and the at least one second device or an attribute of the at least one second device.

In some embodiments, the communication processor is configured to output at least one piece of prompt information; and the processor is configured to generate the topology information based on information in response to the prompt information, where the information in response to the prompt information is from a user and is used to establish the connection relationship between the first device and the at least one second device or establish the connection relationship between the at least one second device.

In some embodiments, the processor is configured to generate the topology information in response to a location change of a device identifier displayed in an interface, where the device identifier is used to identify a device.

In some embodiments, the display unit is configured to display a topology structure, where the topology structure includes the connection relationship.

In some embodiments, the topology structure further includes a relative distance and/or a relative orientation between devices; and a length of a connection line used to reflect the connection relationship is positively correlated with the relative distance, and/or a parameter of a distance between the devices corresponding to the connection relationship is marked on the connection line used to reflect the connection relationship.

In some embodiments, the communication processor is configured to: send a query request, where the query request includes identity information of the first device; and receive the device information from the at least one second device, where the identity information of the first device is used to identify the first device.

In some embodiments, the device information of the second device is carried in a random access request or a response message.

In some embodiments, the device information includes one or more of the following: a device identifier, identity information, a device hardware address, or a device domain name.

In some embodiments, the query request further includes one or more of the following: a security key parameter or information indicating that the first device is a master node.

According to a fourth aspect, an embodiment of this application provides a connection configuration apparatus. The connection configuration apparatus may be a second device, or may be a chip or a chip system in the second device. The connection configuration apparatus includes a processor and a communication processor. When the connection configuration apparatus is the second device, the communication processor may be a communication interface or an interface circuit. The communication processor is configured to perform an operation of communicating with a second device, so that the second device implements the connection configuration method according to any one of the second aspect or the embodiments of the second aspect. When the connection configuration apparatus is the second device, the processor may be a processor. The connection configuration apparatus may further include a storage unit, and the storage unit may be a memory. The storage unit is configured to store instructions, and the processor executes the instructions stored in the storage unit, so that the second device implements the connection configuration method according to any one of the second aspect or the embodiments of the second aspect. When the connection configuration apparatus is the chip or the chip system in the second device, the processor may be a processor. The processor executes the instructions stored in the storage unit, so that the second device implements the connection configuration method according to any one of the second aspect or the embodiments of the second aspect. The storage unit may be a storage unit (for example, a register or a cache) in the chip, or may be a storage unit (for example, a read-only memory or a random access memory) that is in the second device and that is located outside the chip.

For example, the communication processor is configured to send device information of a second device; and the communication processor is further configured to receive topology information from a first device, where the topology information includes a connection relationship between the first device and at least one second device or a connection relationship between at least one second device, and the connection relationship indicates a priority of a device and/or a master-slave relationship between devices.

In some embodiments, the communication processor is configured to: receive a query request from the first device, where the query request includes identity information of the first device; and send the device information of the second device to the first device based on the query request.

In some embodiments, the device information of the second device is carried in a random access request or a response message.

In some embodiments, the device information includes one or more of the following: a device identifier, identity information, a device hardware address, or a device domain name.

In some embodiments, the query request further includes one or more of the following: a security key parameter or information indicating that the first device is a master node.

According to a fifth aspect, an embodiment of this application provides a computer-readable storage medium. The computer-readable storage medium stores a computer program or instructions. When the computer program or the instructions is/are run on a computer, the computer is enabled to perform the connection configuration method according to any one of the implementations of the first aspect or the connection configuration method according to any one of the implementations of the second aspect.

According to a sixth aspect, an embodiment of this application provides a computer program product including instructions. When the instructions are run on a computer, the computer is enabled to perform the connection configuration method according to any one of the implementations of the first aspect or the connection configuration method according to any one of the implementations of the second aspect.

According to a seventh aspect, an embodiment of this application provides a terminal. The terminal includes the connection configuration apparatus according to the third aspect and the embodiments of the third aspect, or the connection configuration apparatus according to the fourth aspect and the embodiments of the fourth aspect.

In some embodiments, the terminal may include an electronic device such as a mobile phone, a tablet computer, a computer, a vehicle (or a head unit in the vehicle), a smart wearable device, a smart manufacturing device, or a smart home device. The electronic device may implement, by using a connection configuration apparatus, a connection configuration method described in embodiments of this application. The connection configuration apparatus described in the foregoing embodiment includes but is not limited to a chip, a module, an integrated circuit, or the like in the foregoing terminal.

According to an eighth aspect, an embodiment of this application provides a connection configuration apparatus. The apparatus includes a processor and a storage medium, the storage medium stores instructions, and when the instructions are run by the processor, the connection configuration method described in any implementation of the first aspect or the connection configuration method described in any implementation of the second aspect is implemented.

According to a ninth aspect, this application provides a chip or a chip system. The chip or the chip system includes at least one processor and a communication interface. The communication interface and the at least one processor are interconnected by using a line, and the at least one processor is configured to run a computer program or instructions, to perform the connection configuration method described in any one of the implementations of the first aspect or the connection configuration method described in any one of the implementations of the second aspect. The communication interface in the chip may be an input/output interface, a pin, a circuit, or the like.

In some embodiments, the chip or the chip system described in this application further includes at least one memory, and the at least one memory stores instructions. The memory may be an internal storage unit of the chip, for example, a register or a cache, or may be a storage unit of the chip (for example, a read-only memory or a random access memory).

It should be understood that the third aspect to the ninth aspect of this application correspond to the technical solutions of the first aspect and the second aspect of this application, and beneficial effects achieved in the aspects and corresponding feasible implementations are similar. Details are not described again.

DESCRIPTION OF EMBODIMENTS

Figure 1A:
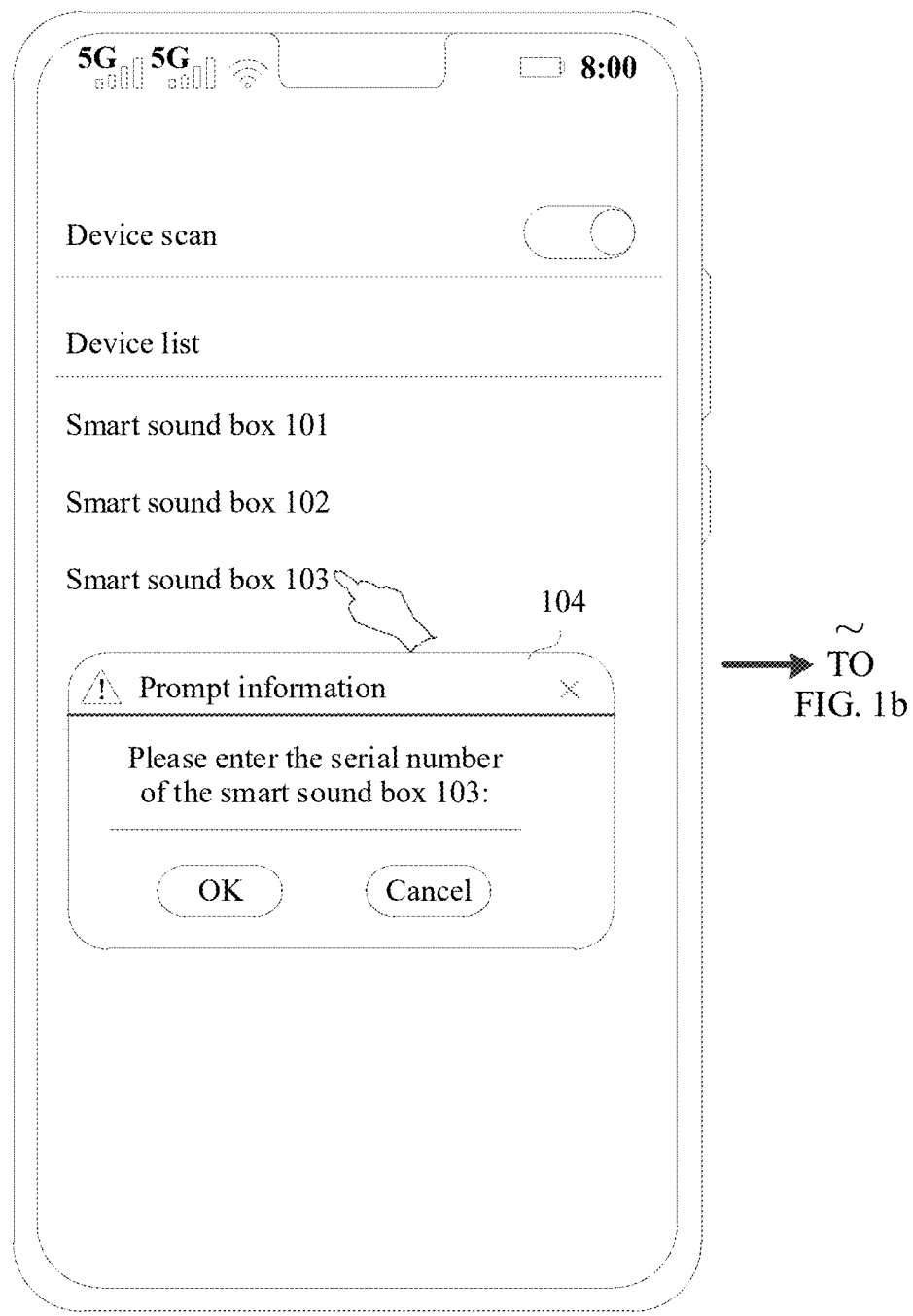
FIG. 1a to FIG. 1c are a schematic diagram of a connection relationship configuration interface according to an embodiment of this application.

For ease of clearly describing the technical solutions in embodiments of this application, the words such as "first" and "second" are used to distinguish between same or similar items whose functions are basically the same in embodiments of this application. For example, a first value and a second value are merely used to distinguish between different values, but not limit a sequence thereof. A person skilled in the art may understand that the words such as "first" and "second" do not limit a quantity or an execution order, and the words such as "first" and "second" do not necessarily indicate a specific difference.

It should be noted that, in this application, words such as "example" or "for example" are used to represent giving examples, illustrations, or descriptions. Any embodiment or design solution described as "example" or "for example" in this application should not be construed as being more preferred or advantageous than other embodiments or design solutions, the words such as "example" or "for example" are used to present related concepts in a specific manner.

In this application, "at least one" means one or more, and "a plurality of" means two or more. The term "and/or" describes an association relationship of associated objects, and indicates that three relationships may exist. For example, A and/or B may indicate the following three cases: Only A exists, both A and B exist, and only B exists. A and B may be singular or plural. The character "I" usually indicates an "or" relationship between the associated objects. "At least one of the following items (pieces)" or a similar expression thereof refers to any combination of these items, including a single item (piece) or any combination of a plurality of items (pieces). For example, at least one of a, b, or c may represent a, b, c, a and b, a and c, b and c, or a, b, and c, where a, b, and c may be singular or plural.

With development of terminal devices, especially smartphones, mutual discovery and connection between devices greatly enrich people's life. Wireless short-distance communication between devices is widely applied in various fields. The wireless short-distance communication may be understood as that mutual communication between devices can be implemented through only a direct wireless connection between the devices or a wireless relay (relay) of another device without using a cellular network and/or the Internet. Generally, a connection relationship of wireless short-distance networking may be configured for a smartphone and another device by using information such as a matching code or a QR code. For example, when a mobile phone is used to control a smart sound box, the smartphone may be used to scan a QR code attached to the smart sound box, to implement one-to-one connection relationship configuration between the smartphone and the smart sound box.

Alternatively, when a smart sound box is in a discoverable or connectable mode, a corresponding smart sound box device is selected in a mobile phone interface, to implement a connection to the smart sound box device.

Figure 1B:
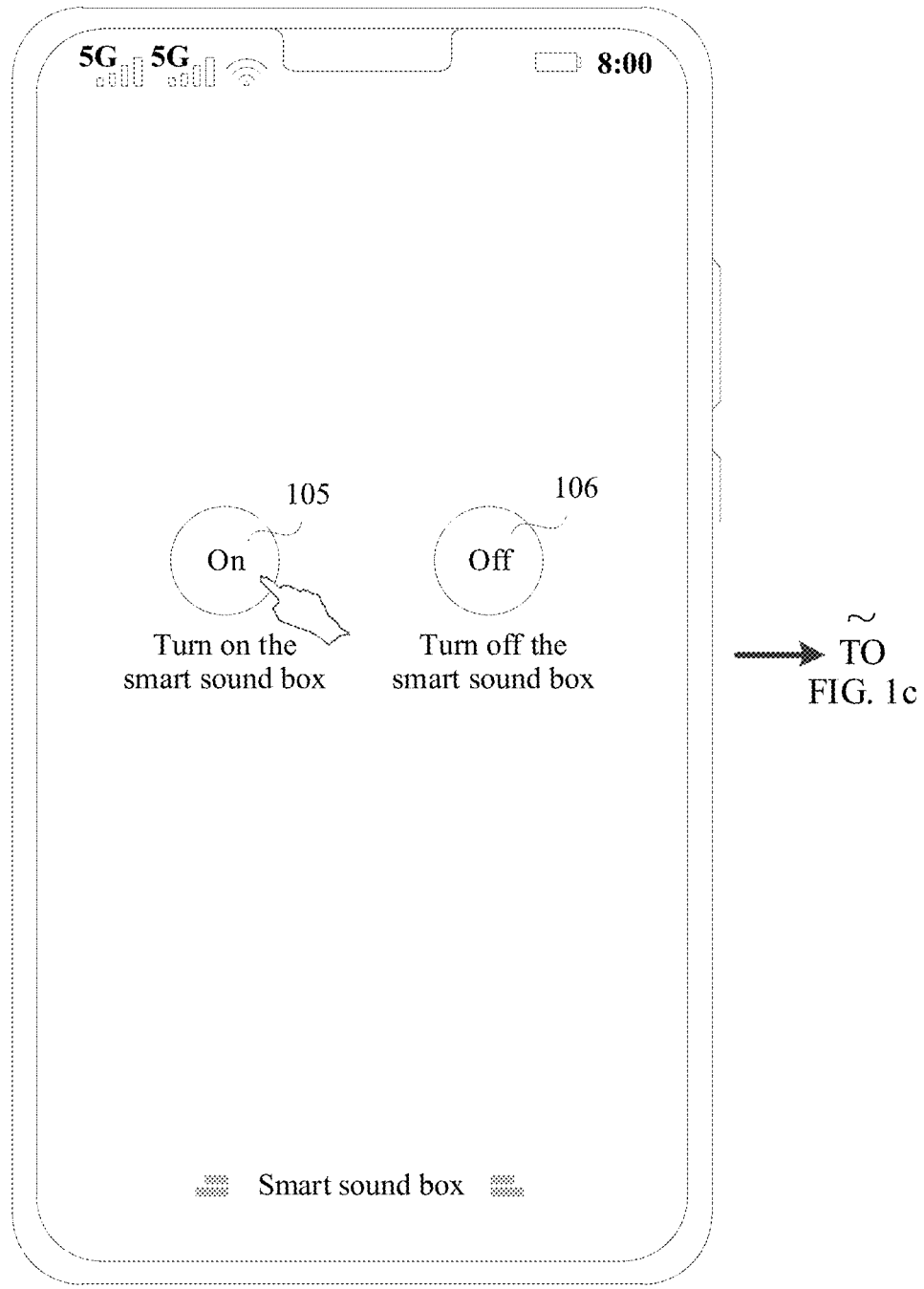
Figure 1C:
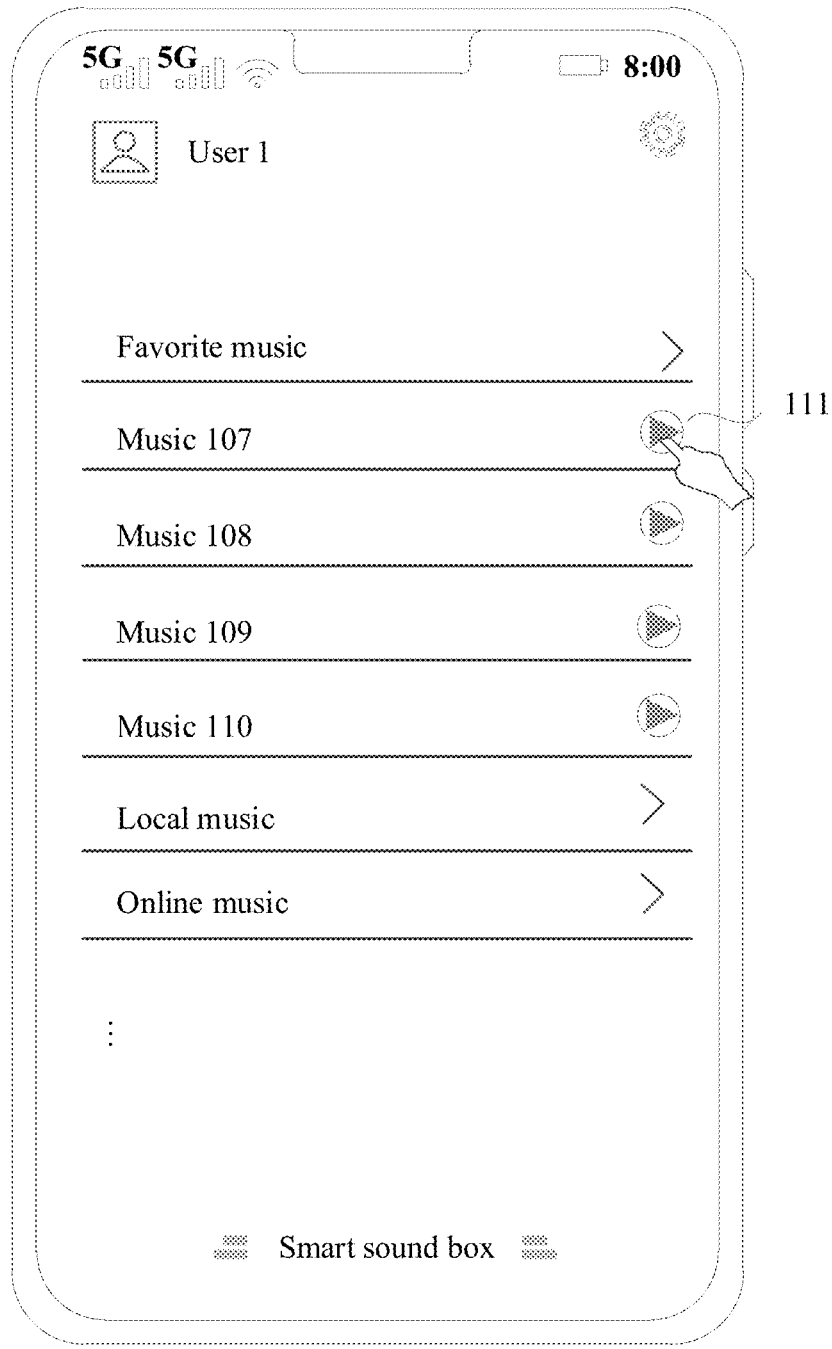

For example, FIG. 1a to FIG. 1c are a schematic diagram of an interface of configuring a connection relationship according to an embodiment of this application. After a user turns on a smart sound box and selects a corresponding smart sound box device on a mobile phone, the user needs to enter a serial number corresponding to the sound box device in a mobile phone interface, to complete a connection between the smartphone and the smart sound box. For example, the user may first enable a device discovery function of the smart sound box, and perform device scanning by using the smartphone. The smartphone may display an interface shown in FIG. 1a. The interface includes device scanning, a device list, and a plurality of devices corresponding to the device list, for example, a smart sound box 101, a smart sound box 102, and a smart sound box 103. When the user triggers a control corresponding to the smart sound box 103, to choose to connect the smartphone to the smart sound box 103, the smartphone may display prompt information 104. The prompt information is used to prompt the user to enter a serial number of the smart sound box 103. The user enters the serial number of the smart sound box 103, to complete a device connection between the smartphone and the smart sound box.

After the connection relationship is successfully configured, the smartphone may exchange information with the smart sound box, so that the smart sound box can be controlled to be turned on or turned off by using the smartphone. As shown in an interface in FIG. 1B, the interface may include a turn-on control 105 and a turn-off control 106. Through the turn-on control 105 and the turn-off control 106, turn-on or turn-off of the smart sound box can be controlled by using the smartphone.

Alternatively, the smartphone may implement a function such as controlling the smart sound box to play a song stored in the smartphone. For example, when the user triggers the turn-on control 105 in the interface shown in FIG. 1B, an interface shown in FIG. 1c may be displayed. The interface may include favorite music, local music, online music, and the like. The favorite music may include music 107, music 108, music 109, music 110, and the like. When the user triggers a play control 111 corresponding to the music 107, the smart sound box may play the music 107.

However, a connection process of the foregoing devices is complex. Especially, for an elderly person or a child, practicability is relatively poor. For example, in a home scenario, multi-device connection and management have the following problems.

First, in a home environment, there is not always only a single connection between a smartphone and another device, and there may be a mutual connection between other smart devices. For example, when a user needs to play a video, a television may be connected to a plurality of sound boxes in the home. Generally, in this case, it is very difficult to enter a verification code or a QR code of a sound box device on the television. In addition, generally, when there are a plurality of sound box devices, connection relationship configuration needs to be completed one by one.

Then, a connection relationship between devices is not fixed, and the connection relationship between the devices may change with a service requirement of the user. For example, in the morning, the user plays audio data corresponding to the television by using a plurality of sound boxes. In the afternoon, when the user needs to play music in the smartphone by using the plurality of sound boxes, a connection relationship between the mobile phone and the plurality of sound boxes needs to be established. Generally, when the connection relationship between the devices changes, the connection relationship may need to be reconfigured.

Further, a large quantity of smart devices may not have an input interface. Therefore, a connection relationship between the devices cannot be configured by using conventional information such as a matching code or a password. In this case, a third-party device may be required for assistance. For example, when a smart sound box needs to be connected to a wireless fidelity (Wi-Fi) access point, a mobile phone usually needs to first establish a connection to the smart sound box, and then corresponding information such as a Wi-Fi user name or a password is entered, that is, the corresponding information such as the Wi-Fi user name or the password is transferred to the smart sound box. Only after this, the smart sound box can establish a Wi-Fi connection by using the information.

In the foregoing scenario in which a plurality of devices perform wireless short-distance communication, there is a problem that a device configuration and connection process is cumbersome, an operation is complex, and it is difficult to perform proper configuration and management between the devices. Similarly, in a scenario in which network communication is performed based on a plurality of nodes, there is also a problem that network communication is affected due to lack of proper management on the nodes. For example, in a wireless mesh (mesh) network-based network connection, nodes in each mesh network are connected in a wireless multi-hop manner. When any node in the network performs communication, the node selects an available communication resource by preempting the resource. Therefore, the mesh network lacks unified management for resource allocation of each node. As a result, when two nodes perform communication at the same time, and the two nodes preempt a same resource at the same time, a resource conflict occurs, causing a communication failure.

In view of this, according to a connection configuration method and apparatus provided in embodiments of this application, device information of at least one second device may be obtained, and based on different device information of second devices, topology information corresponding to the device information of the second devices is generated, so that a connection configuration relationship between the plurality of devices can be established based on the topology information generated based on the different device information. A cumbersome process of performing one-to-one device connection configuration in an existing manner can be resolved, and a connection configuration process between a plurality of devices is simplified, so that efficient communication between devices can be implemented through a network formed based on the configuration relationship.

To better understand the method in embodiments of this application, the following first describes an application scenario to which embodiments of this application are applicable.

In some embodiments, the connection configuration method provided in embodiments of this application may be applied to a smart home scenario. For example, devices such as a smartphone, a smartwatch, a tablet computer, a smart refrigerator, a smart television, a smart vacuum cleaner, or a smart sound box in a home environment may establish a communication network. In this way, management, control, and data transmission for another device in the network can be implemented by using a device such as the smartphone or the television. The device such as the smartphone or the television can implement audio control and video control for the another device in the network or control for another function.

Figure 2:
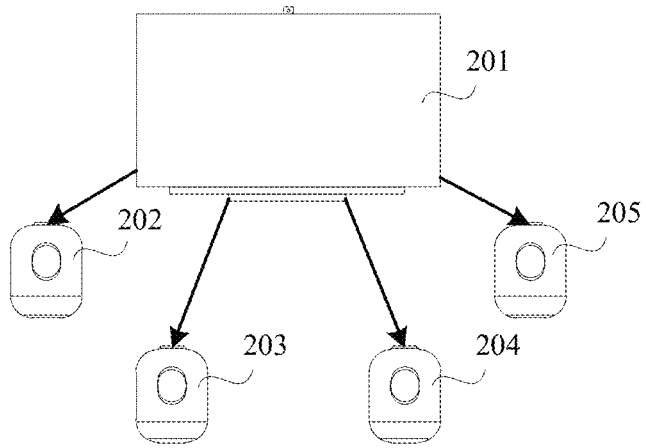
FIG. 2 is a schematic diagram of an application scenario according to an embodiment of this application.
Figure 3:
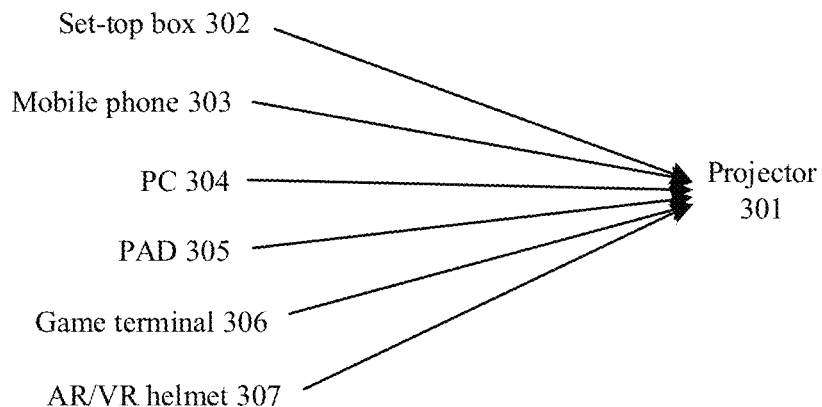
FIG. 3 is a schematic diagram of another application scenario according to an embodiment of this application.
Figure 4:
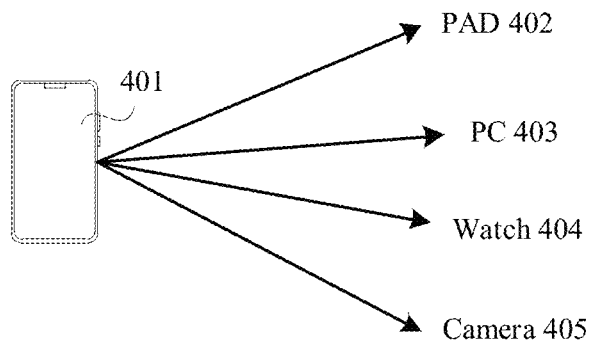
FIG. 4 is a schematic diagram of another application scenario according to an embodiment of this application.

For example, FIG. 2 to FIG. 4 are schematic diagrams of device connection in different scenarios according to an embodiment of this application. FIG. 2 shows a scenario in which audio control is implemented based on a device connection, FIG. 3 shows a scenario in which video control is implemented based on a device connection, and FIG. 4 shows a scenario in which a full mesh of a mobile phone is implemented based on a device connection.

For example, FIG. 2 is a schematic diagram of an application scenario according to an embodiment of this application. As shown in FIG. 2, in a scenario of implementing audio control, a television or set-top box 201 may establish an inter-device network with a smart sound box 202, a smart sound box 203, a smart sound box 204, and a smart sound box 205. After the network is successfully established, the television or set-top box 201 may control and manage audio functions of a plurality of smart sound boxes in the network. For example, the television or set-top box 201 may play a sound by using the smart sound box 202 and the smart sound box 203, and control the smart sound box 204 and the smart sound box 205 to be muted.

For example, FIG. 3 is a schematic diagram of another application scenario according to an embodiment of this application. As shown in FIG. 3, in a scenario of implementing video control, a projector 301 may establish an inter-device network with a set-top box 302, a smartphone 303, a tablet computer (portable android device, PAD) 304, a personal computer (PC) 305, a game console terminal 306, an augmented reality (AR) or virtual reality (VR) helmet 307, or another device. After the network is successfully established, the projector 301 may control and manage video functions of a plurality of devices in the network. For example, the projector 301 may control the AR/VR helmet 307 to play a video, so that a user can watch, through the AR or VR helmet 307, video content transferred by the projector 301.

For example, FIG. 4 is a schematic diagram of another application scenario according to an embodiment of this application. As shown in FIG. 4, in a scenario of implementing a full mesh of a mobile phone, a smartphone 401 may establish an inter-device network with other terminal devices such as a PAD 402, a PC 403, a watch 404, and a camera 405. After the network is successfully established, the smartphone 401 may control and manage a plurality of devices in the network. For example, the smartphone 401 may transfer a file to the PC 403, so that a user can edit, by using the PC 403, the file transferred by the smartphone 401.

It may be understood that, the terminal device described in embodiments of this application includes but is not limited to a mobile station (MS), a mobile terminal, a mobile phone (mobile telephone), a handset, portable equipment, and the like. The terminal device may communicate with one or more core networks via a radio access network (RAN). For example, the terminal device may be a mobile phone (or referred to as a "cellular" phone) or a computer having a wireless communication function. Alternatively, the terminal device may be a computer with wireless sending and receiving functions, a virtual reality terminal device, an augmented reality terminal device, a wireless terminal in industrial control, a wireless terminal in self driving, a wireless terminal in telemedicine, a wireless terminal in a smart grid or smart manufacturing, a wireless terminal in transportation safety, a drone, a wireless terminal in a smart city, a smart appliance in a smart home, another wireless terminal, or the like. Terminals may have different names in different networks, for example, user equipment, mobile station, subscriber unit, station, cellular phone, personal digital assistant, wireless modem, wireless communication device, hand-held device, laptop computer, cordless phone, and wireless local loop station.

In some embodiments, the connection configuration method provided in embodiments of this application may also be applied to the intelligent vehicle field. For example, a smartphone of a user may establish a configuration connection relationship with a device such as a door lock of a vehicle or an air conditioner in a vehicle, so that a function of opening the door lock of the vehicle or turning on the air conditioner in the vehicle can be implemented by using the smartphone.

In some embodiments, the connection configuration method provided in embodiments of this application may also be applied to the medical and health field. For example, a terminal device such as a smartphone, a smartwatch, or a tablet computer of a user may establish a configuration connection relationship with a sensor that obtains human body data, so that various indicators, for example, data such as a heart rate or blood pressure, of a human body can be monitored by using the terminal device at any time, to ensure human body safety.

It may be understood that in the foregoing wireless short-distance communication networking scenario, because a communication network constructed in a short distance has advantages such as low energy consumption and low costs, the connection configuration method provided in embodiments of this application may be flexibly applied to various fields or scenarios related to wireless short-distance communication. This is not limited in embodiments of this application.

The following describes, by using embodiments, in detail the technical solutions of this application and how the technical solutions of this application resolve the foregoing technical problems. The following several embodiments may be implemented independently, or may be combined with each other. For same or similar concepts or processes, details may not be described in some embodiments.

Figure 5:
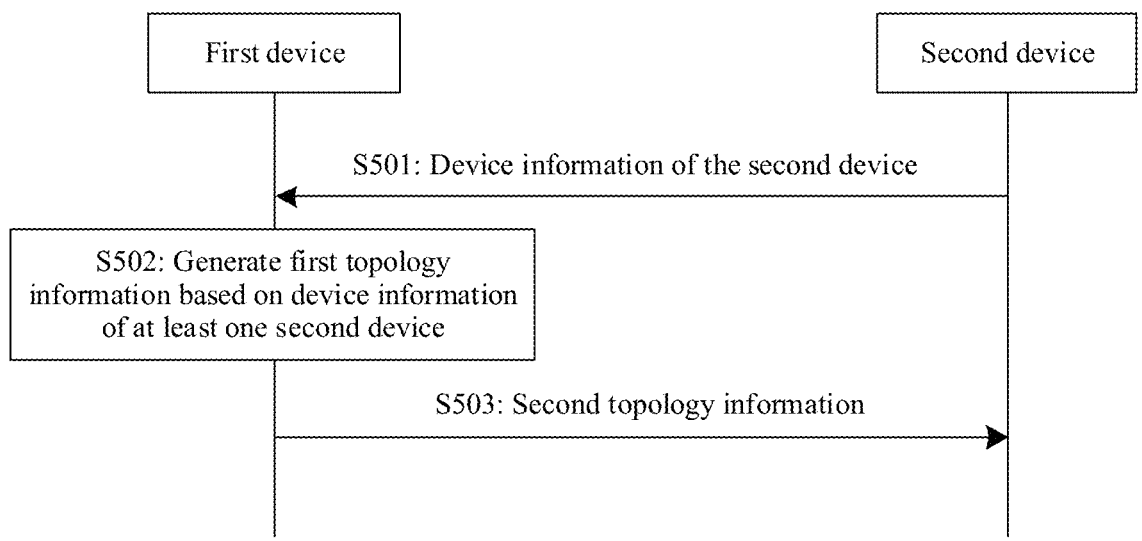
FIG. 5 is a schematic flowchart of a connection configuration method according to an embodiment of this application.

For example, FIG. 5 is a schematic flowchart of a connection configuration method according to an embodiment of this application. As shown in FIG. 5, the method includes the following operations.

S501: A first device obtains device information of at least one second device.

In this embodiment of this application, the first device may be a device that has a relatively strong processing capability and that can obtain the device information of the second device. For example, the first device may be a terminal device that has a human-computer interaction interface, for example, a smartphone, a tablet computer, or a computer.

In this embodiment of this application, the second device is a device that can be sensed by the first device. That the first device obtains the device information of the at least one second device may be: The first device may obtain device information of one second device or device information of a plurality of second devices. The device information of the second device may be information used to uniquely identify a device identity of the second device in a local range or a global range.

For example, the device information may include one or more of the following device information: a device identifier, identity information, a device hardware address, a device temporary address, or the like.

The device identifier may be used to identify a device. For example, the device identifier may include an identifier including a character, a character string, or a number, for example, device (device) 1, device 2, or device 3.

The identity information may be information used to identify an identity of a device. For example, the device identity information may include a device name or the like, such as a brand A sound box, a brand B computer, or a brand C mobile phone.

The device hardware address may be used to identify an address of a device in a network. For example, the hardware address may include a media access control address (MAC). For example, 08:00:20:0A:8C:6D or the like may be a hardware address of a device.

The device temporary address may be used to identify an address of a device in a local range. Generally, a device may randomly generate a random number within a large range, for example, 0 to $2^{48}-1$, as a temporary address. For example, because the range is large enough, in a local range, a probability that two or more devices generate a same random number is almost 0. In this case, the device temporary address may also be used as identity information of the device.

It may be understood that device information of the first device or the device information of the second device may include other content based on an actual scenario. This is not limited in this embodiment of this application. In some embodiments, the device information of the second device may be carried in a random access request or a response message. For example, the first device may send a query instruction to the second device, where the query instruction includes the device information of the first device. The second device receives the query instruction, and sends a random access request or a response message to the first device. The random access request or the response message includes the device information of the second device. In this case, the first device may obtain the device information of the at least one second device.

S502: The first device generates first topology information based on the device information of the at least one second device.

In this embodiment of this application, the first topology information indicates a connection relationship between the first device and the at least one second device or a connection relationship between the at least one second device, and the connection relationship indicates a priority of a device and/or a master-slave relationship between devices. For example, the first topology information may be displayed on the first device. This indicates that information displayed on the first device may be the first topology information. For example, the first topology information may include information indicating a connection relationship between devices, information indicating a relative distance between devices, information indicating a relative orientation between devices, or the like.

In some embodiments, the device priority may indicate a topology information generation order, a topology information transfer order, or the like. For example, when a priority of the first device is higher than that of the second device, the first device may preferentially generate topology information based on the device information of the second device. When devices include a third device, the priority of the first device is higher than a priority of the third device, and the priority of the third device is higher than the priority of the second device, the first device may preferentially generate topology information based on device information of the third device. In some embodiments, the priority may be further used in a scenario in which topology information is transferred. For example, the topology information may be preferentially transferred to a device with a higher priority.

In some embodiments, the device priority may indicate a management relationship between devices. A device with a higher priority can manage a device with a lower priority.

The master-slave relationship between the devices may indicate an attribute of the devices. For example, a master node of a device may be a node having a resource allocation capability or a resource scheduling capability, and the master node manages a slave node. For example, the master node may schedule a time-frequency resource for the slave node. A slave node of a device may be a node that follows scheduling of a master node. For example, the slave node may perform communication by using a time-frequency resource scheduled by the master node.

In this embodiment of this application, the connection relationship is related to at least one service. The service may indicate a purpose of establishing the connection relationship. For example, when the service is playing music, the first device may establish, based on a purpose of playing music, a connection relationship with a device, such as a sound box, that can play music in the second device.

S503: The first device sends second topology information to the second device.

Accordingly, the second device receives the second topology information. Further, the second device may implement a connection between devices based on the second topology information. The second topology information may be information indicating a connection relationship between the devices, the second topology information includes or indicates the connection relationship between the first device and the at least one second device or the connection relationship between the at least one second device, and the connection relationship indicates a priority of a device and/or a master-slave relationship between devices. For example, the first device sends, to the second device, the second topology information that includes or indicates the connection relationship between the first device and the second device, so that the second device may determine to establish a connection to the first device.

It may be understood that the second topology information in operation S503 may include all or some information in the first topology information in operation S502, or may include other information than all or some information in the first topology information, or may include information indicating or representing all or some information in the first topology information, or may include information corresponding to all or some information in the first topology information. This is not limited herein, and may be implemented based on a requirement.

In conclusion, according to the connection configuration method provided in this embodiment of this application, the device information of the at least one second device may be obtained, and based on different device information of second devices, topology information corresponding to the device information of the second devices is generated, so that a connection configuration relationship between the plurality of devices can be established based on the topology information generated based on the different device information. This can resolve a cumbersome process of performing one-to-one device configuration in an existing manner, and simplify a connection configuration process between a plurality of devices, and the method is simple and efficient.

Based on the embodiment corresponding to FIG. 5, in some embodiments, in operation S502, the first topology information may be generated in three manners. Manner 1: Topology information is generated based on input information from a user (as shown in an embodiment corresponding to FIG. 6 and FIG. 7). Manner 2: Topology information is generated based on an input from a user for indication information sent by a device (as shown in an embodiment corresponding to FIG. 8). Manner 3: Topology information is generated based on a location change of a device identifier displayed in an interface of a device (as shown in an embodiment corresponding to FIG. 9a and FIG. 9b). The following describes the three manners. It should be noted that content displayed on a home screen in the following accompanying drawings is merely an example, and does not limit an actual application scenario.

Manner 1: Topology information is generated based on input information from a user, and then a topology structure is displayed. In this embodiment of this application, the input information may include drawing information or configuration information, and the topology structure includes a connection relationship.

In Manner 1, the input information may include the drawing information. The drawing information is obtained based on a drawing operation from the user on a connection line between the first device and the at least one second device or a connection line between the at least one second device. The drawing operation may include a sliding operation, a tapping operation, another operation, or the like. For example, when the drawing operation includes a sliding operation, the user may slide from a location of a device 1 to a location of a device 2, to generate an arrow pointing from the device 1 to the device 2. When the drawing operation includes a tapping operation, the user may tap a device 1 and then tap a device 2, to generate an arrow pointing from the device 1 to the device 2; or the user may tap a device 2 and then tap a device 1, to generate an arrow pointing from the device 2 to the device 1.

The arrow may indicate a subordinate relationship between the devices. For example, a unidirectional arrow may be used to point to a slave node device, and the other end of the unidirectional arrow is a master node device; or a unidirectional arrow may be used to point to a master node device, and the other end of the unidirectional arrow is a slave node device.

In some embodiments, other than the foregoing arrow used to indicate that a device is a master node or a slave node, different colors or grayscales may alternatively be used to represent different device types. For example, dark gray may be used to represent a master node device, and light gray may be used to represent a slave node device.

Figure 6:
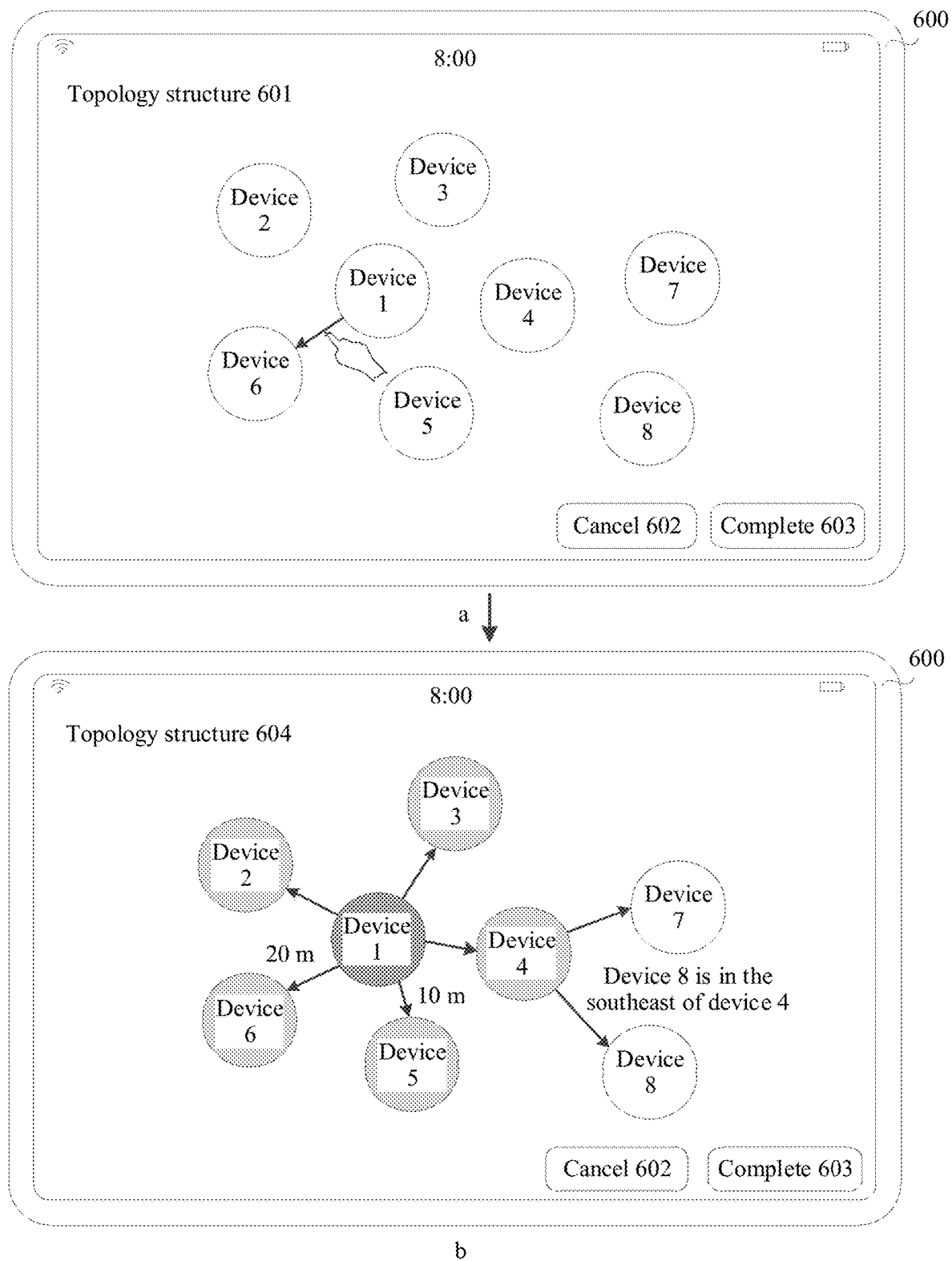
FIG. 6 is a schematic diagram of an interface of generating topology information according to an embodiment of this application.

For example, FIG. 6 is a schematic diagram of an interface of generating topology information according to an embodiment of this application. As shown in FIG. 6, an example in which the first device is a PAD 600 is used. After the PAD 600 learns that the user enables a setting function or opens an application in the PAD 600, the PAD 600 may display an interface shown in a in FIG. 6. The interface may include a topology structure 601. The topology structure 601 may display device information of a plurality of devices that is obtained by the PAD 600. For example, the device information of the device may be a device identifier. The device identifier may indicate a plurality of devices such as a device 1 (which may alternatively be understood as the PAD 600), a device 2, a device 3, a device 4, a device 5, a device 6, a device 7, or a device 8. The topology structure 601 may be used to draw a connection line between devices, to generate topology information.

In the interface shown in a in FIG. 6, the user may draw a connection line in the topology structure 601 based on the device information of the plurality of devices. The PAD 600 receives drawing information generated based on a drawing operation of the user, and may generate topology information based on the drawing information, to construct a connection configuration between the devices. For example, the user may draw a connection line between the device 1 and the device 6, and use an arrow to point to the device 6. The arrow points to a slave node device. Similarly, the user may draw a connection line between the device 1 and the device 2, and use an arrow to point to the device 2; the user may draw a connection line between the device 1 and the device 3, and use an arrow to point to the device 3; the user may draw a connection line between the device 1 and the device 4, and use an arrow to point to the device 4; the user may draw a connection line between the device 1 and the device 5, and use an arrow to point to the device 5; the user may draw a connection line between the device 4 and the device 7, and use an arrow to point to the device 7; and the user may draw a connection line between the device 4 and the device 8, use an arrow to point to the device 8, and tap a complete control 603, to generate topology information.

Then, the PAD 600 may display an interface shown in b in FIG. 6, and the interface may display a topology structure constructed based on the topology information. The topology structure includes a connection relationship. For example, in the interface shown in b in FIG. 6, the topology structure may include a topology structure constructed by using a connection relationship between the device 1, the device 2, the device 3, the device 4, the device 5, the device 6, the device 7, and the device 8. Subsequently, the user can implement networking communication between devices based on the topology structure. In some embodiments, when the user wants to reconstruct the topology structure, the user may tap a cancel control 603 in the interface shown in b in FIG. 6, and then perform the foregoing process again.

In some embodiments, the topology structure may also include a relative distance and/or a relative orientation between devices. A length of a connection line used to reflect the connection relationship is positively correlated with the relative distance, and/or a parameter of a distance between the devices corresponding to the connection relationship is marked on the connection line used to reflect the connection relationship. For example, a longer distance between devices indicates a longer connection line between the devices displayed in the topology structure. For example, in the interface shown in b in FIG. 6, the topology structure may show that a relative distance between the device 1 and the device 6 may be 20 m, a relative distance between the device 1 and the device 5 may be 10 m, and the device 8 may be in the southeast of the device 4. It may be understood that the relative distance and/or the relative orientation may be used to display a more accurate topology structure.

In Manner 1, the input information may alternatively include the configuration information. The configuration information is obtained based on a configuration operation from the user on an attribute of the first device and the at least one second device or an attribute of the at least one second device. The attribute of the devices may be that a device is a master node or a slave node. The configuration operation may be used to separately configure an attribute of each device, or may be used to configure attributes of a plurality of devices at a time. The configuration operation may be another operation such as a tapping operation and an input operation.

Figure 7:
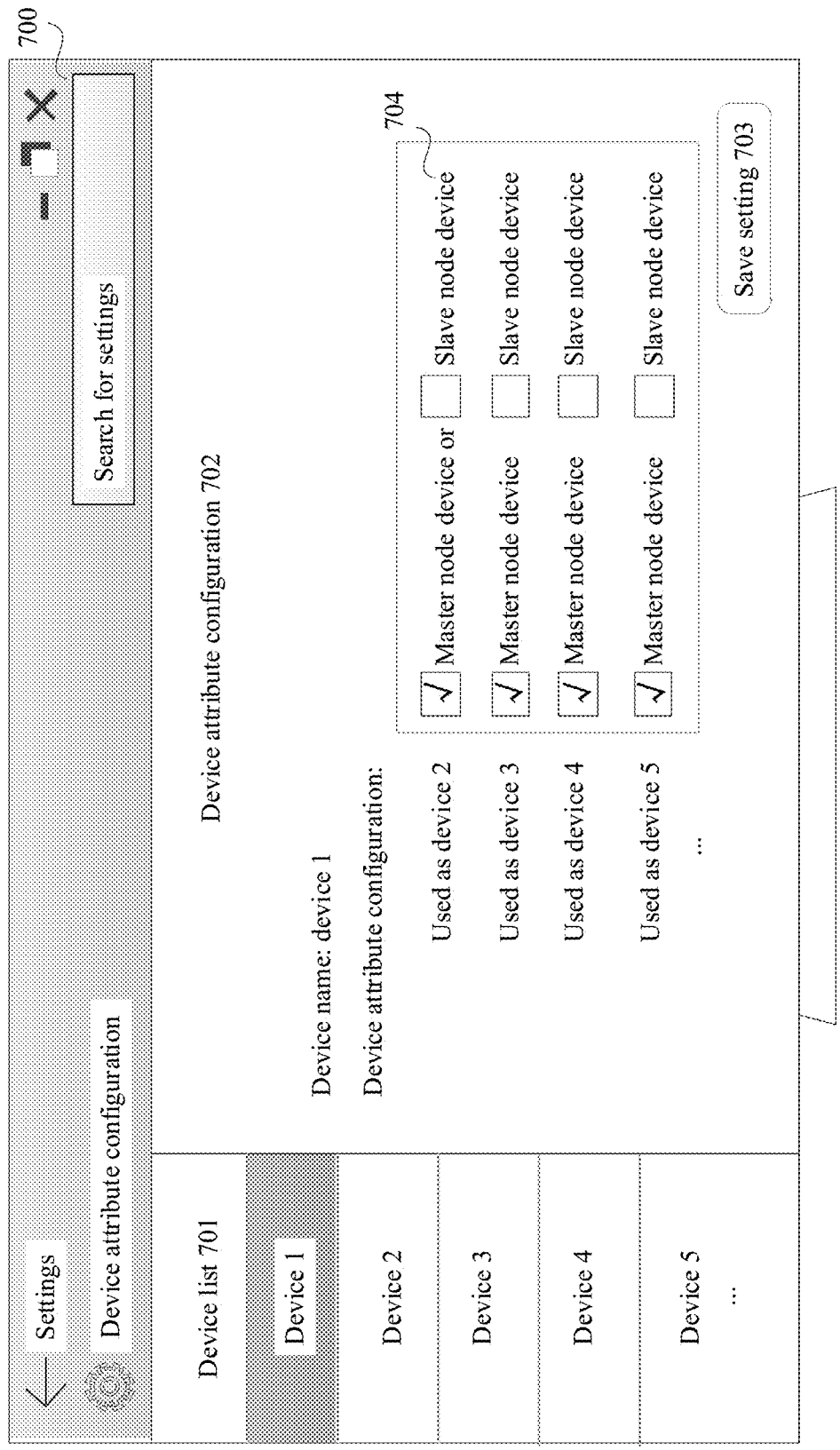
FIG. 7 is a schematic diagram of another interface of generating topology information according to an embodiment of this application.

For example, FIG. 7 is a schematic diagram of another interface of generating topology information according to an embodiment of this application. As shown in FIG. 7, an example in which the first device is a computer 700 is used. After the computer 700 learns that the user enables a setting function or opens an application in the computer 700, the computer 700 may display an interface shown in FIG. 7. As shown in the interface in FIG. 7, the interface may include a device list 701 and a device attribute configuration 702. The device list 701 may display device information of a plurality of devices that is obtained by the computer 700. For example, the device information of the device may be a device identifier. The device information may indicate a plurality of devices such as a device 1 (which may alternatively be understood as the computer 700), a device 2, a device 3, a device 4, and a device 5.

As shown in FIG. 7, in the device attribute configuration 702, the user may configure an attribute of a device in a topology structure based on the device information. The computer 700 receives a configuration operation of the user for the attribute of the device, and may obtain topology information based on the configuration operation. For example, the user may tap the device 1 in the device list 701, to choose to configure a device attribute for the device 1. The device attribute configuration 702 may display a plurality of types of information about a device corresponding to the device 1. Then, the user may select an option of a master node device used as the device 2, an option of a master node device used as the device 3, an option of a master node device used as the device 4, and an option of a master node device used as the device 5 in a solid-line box 704, and tap a setting save control 703, to complete generation of topology information of the device 1, the device 2, the device 3, the device 4, and the device 5, so as to construct a topology structure.

Manner 2: Topology information is generated based on an input from a user for indication information sent by a device, the first device outputs at least one piece of prompt information; and the first device generates topology information based on information in response to the prompt information, and then displays a topology structure.

In this embodiment of this application, the information in response to the prompt information is from the user and is used to establish the connection relationship between the first device and the at least one second device or establish the connection relationship between the at least one second device.

Figure 8:
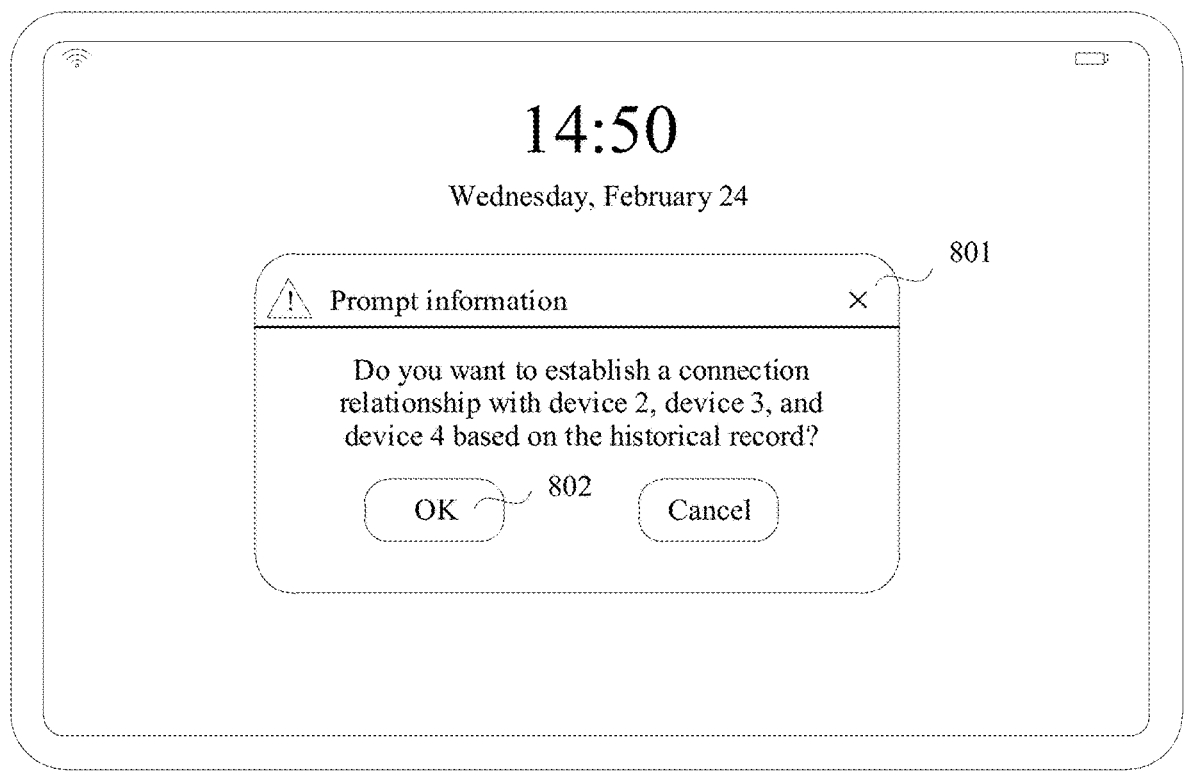
FIG. 8 is a schematic diagram of another interface of generating topology information according to an embodiment of this application.

For example, FIG. 8 is a schematic diagram of another interface of generating topology information according to an embodiment of this application. For example, the first device may store a historical record of a configured connection to the at least one second device. For example, a device 1 has previously established a connection relationship with a device 2, a device 3, and a device 4, and stores a corresponding historical record. When the device 1 receives device information of the device 2, the device 3, and the device 4, the device 1 may display prompt information in the interface, as shown in an interface in FIG. 8. Prompt information 801 is displayed in the interface, and the prompt information 801 includes: Do you want to establish a connection relationship with device 2, device 3, and device 4 based on the historical record. When the user triggers a confirmation control 802, the device 1 may establish connections to the device 2, the device 3, and the device 4 based on confirmation information in response to the prompt information, to generate topology information.

For example, when the first device finds that several sound box devices of a same brand (for example, a brand B) exist around, an interface of the first device is presented to determine whether the first device is used to connect to the several sound box devices of the brand B. When the user chooses to agree, topology information is generated.

In some embodiments, the prompt information is presented in the interface only when the first device finds, within a fixed time window, that several sound box devices of a same brand exist around.

For example, when the first device finds that several sound box devices of a brand A and several sound box devices of a brand B exist around, an interface of the first device is presented to determine whether the first device is used to connect to the several sound box devices of the brand B. When the user chooses to agree, topology information is generated.

In some embodiments, analysis may be performed based on an algorithm such as AI or big data such as a connection habit of the user, and topology structures such as a topology structure A, a topology structure B, and a topology structure C may be prompted in a user interface for the user to select. When the user selects one of the topology structures, topology information is generated.

In some embodiments, when the first device is connected to the Internet, the first device may also obtain topology information between a large quantity of devices based on big data, and select topology information suitable for the first device. Subsequently, prompt information may be sent to the user to indicate whether to use the topology information obtained based on the big data.

Manner 3: Topology information is generated based on a location change of a device identifier displayed in an interface of a device, the first device generates topology information in response to a location change of a device identifier displayed in an interface, and then displays a topology structure.

In this embodiment of this application, the user may construct a connection relationship between devices by performing another operation such as a drag operation.

Figure 9A:
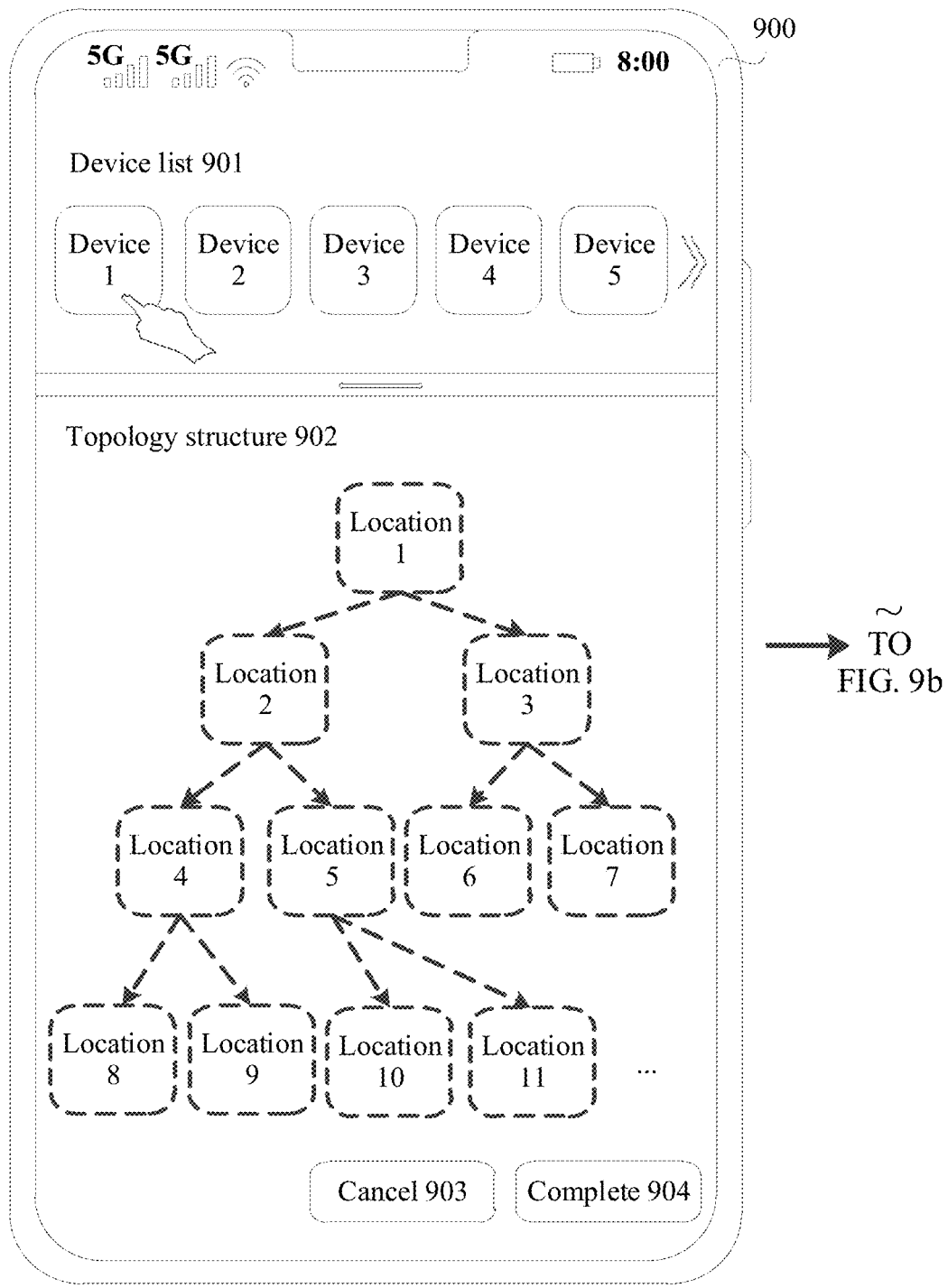
FIG. 9a and FIG. 9b are a schematic diagram of another interface of generating topology information according to an embodiment of this application.
Figure 9B:
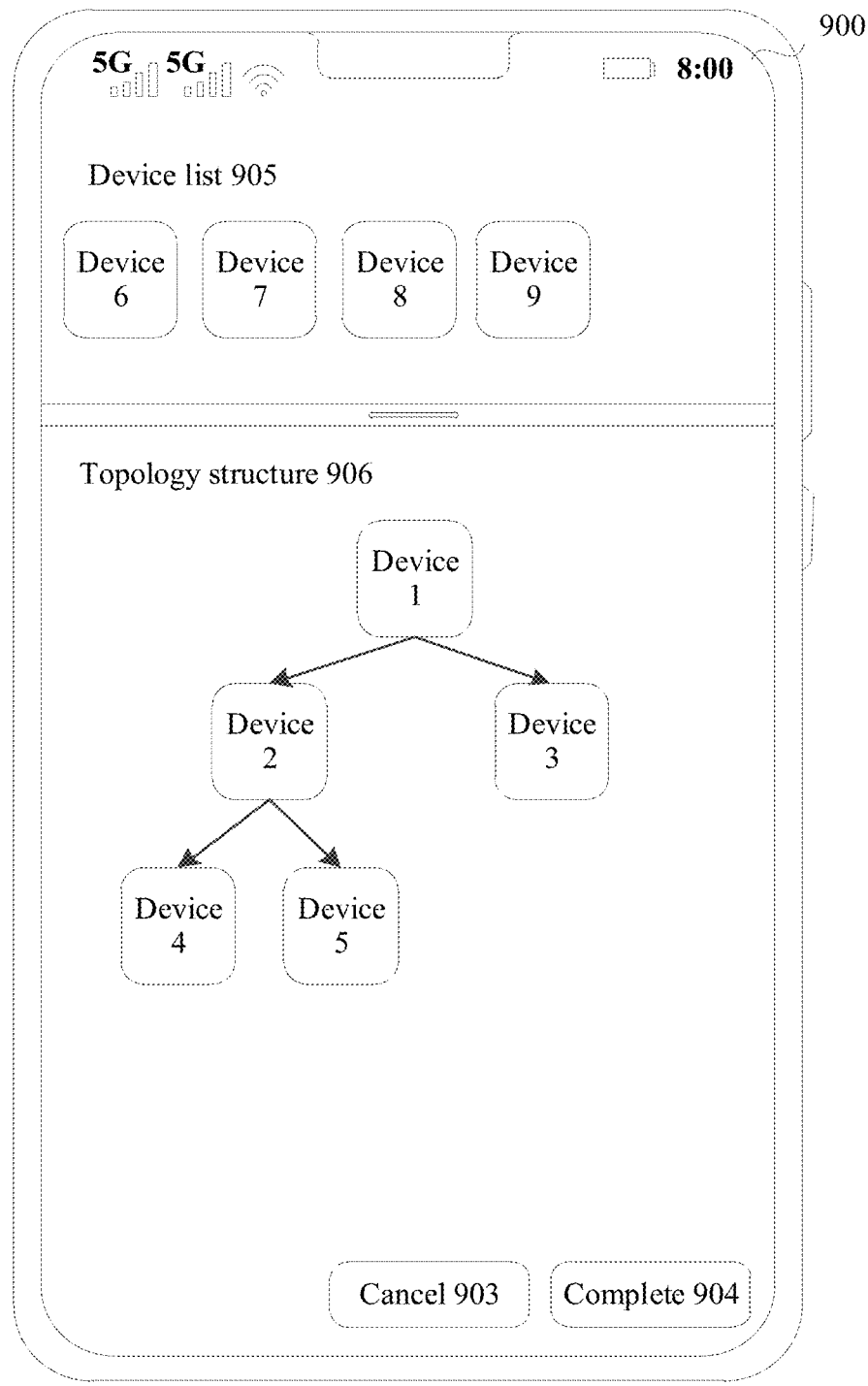

For example, FIG. 9a and FIG. 9b are a schematic diagram of another interface of generating topology information according to an embodiment of this application. As shown in FIG. 9a and FIG. 9b, an example in which the first device is a smartphone 900 is used. After the smartphone 900 learns that the user enables a setting function or opens an application in the smartphone 900, the smartphone 900 may display an interface shown in FIG. 9a. The interface may include a device list 901 and a topology structure 902. The device list 901 may display device information of a plurality of devices that is obtained by the smartphone 900. For example, the device information of the device may be a device identifier. The device information may indicate a plurality of devices such as a device 1 (which may alternatively be understood as the smartphone 900), a device 2, a device 3, a device 4, or a device 5. The topology structure 902 may display a plurality of locations that are corresponding to the topology structure and that are used to set a node. The locations corresponding to the topology structure may include locations such as a location 1, a location 2, a location 3, a location 4, a location 5, a location 6, a location 7, a location 8, a location 9, a location 10, or a location 11.

For example, in the interface shown in FIG. 9a, the user may drag any device in the device list 901 to any location in the topology structure 902. The smartphone 900 receives a location change that is of a device identifier and that is generated due to the dragging, and may generate topology information based on the location change and the topology structure presented in the topology structure 902. For example, the user may drag the device 1 to the location 1, drag the device 2 to the location 2, drag the device 3 to the location 3, drag the device 4 to the location 4, drag the device 5 to the location 5, and tap a complete control 904, so that the smartphone 900 may generate topology information based on changes of the device 1, the device 2, the device 3, the device 4, and the device 5, then establish a topology structure, and display an interface shown in FIG. 9b. In addition, the interface shown in FIG. 9b may further include a plurality of devices in a device list 905 that do not form the topology structure, for example, other devices such as a device 6, a device 7, a device 8, and a device 9.

In some embodiments, when the user wants to reconstruct the topology structure, the user may tap a cancel control 903 in the interface shown in FIG. 9b, and then perform the foregoing drag operation again to construct a topology structure, or directly perform the foregoing drag operation again to construct a topology structure.

Based on this, flexible configuration of the topology information can be implemented, and then a network can be constructed based on the topology information, so that efficient communication between devices can be implemented based on the network.

Based on the embodiment corresponding to FIG. 5, in some embodiments, S501 may include: The first device sends a query request, and the second device sends the device information of the second device to the first device based on the query request.

In this embodiment of this application, the query request includes identity information of the first device, and the identity information of the first device is used to identify the first device.

The query request may further include other information such as a security key parameter or information indicating that the first device is a master node. The security key parameter may include a personal area network security key parameter or the like. The security key parameter is used to ensure reliability of communication between devices.

For example, for a smart appliance B and a smart appliance C that were separately connected to a mobile phone A, when the smart appliance B and the smart appliance C need to be connected, because both the smart appliance B and the smart appliance C were connected to the mobile phone A before, both the smart appliance B and the smart appliance C may have a personal area network security key parameter configured by the mobile phone A.

In this embodiment of this application, the device information of the second device may be carried in a random access request or a response message. Manner A: The device information of the second device is carried in the random access request (as shown in an embodiment corresponding to FIG. 10 and FIG. 11). Manner B: The device information of the second device is carried in the response message (as shown in an embodiment corresponding to FIG. 12).

Figure 10:
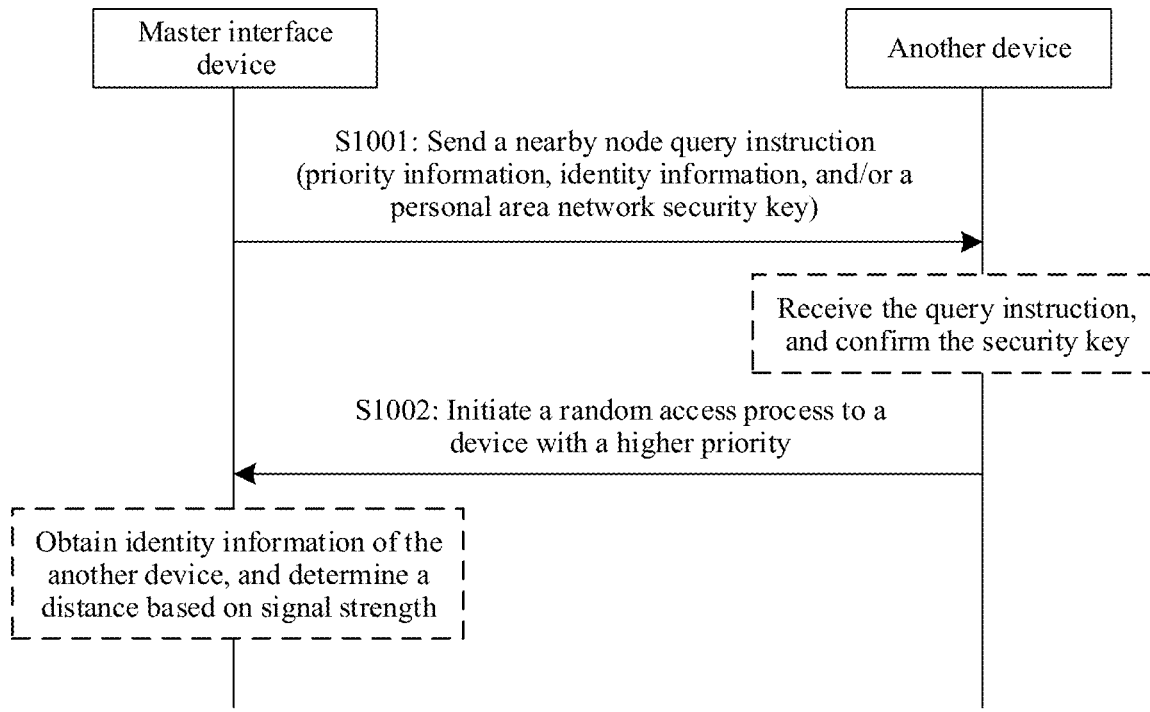
FIG. 10 is a schematic flowchart of obtaining device information according to an embodiment of this application.

Manner A: The device information of the second device is carried in the random access request. For example, an example in which the first device is a master interface device and the second device is another device is used to describe a process in which the first device obtains the device information of the second device based on the random access request. FIG. 10 is a schematic flowchart of obtaining device information according to an embodiment of this application. As shown in FIG. 10, a process of obtaining the device information may include the following operations.

S1001: A master interface device sends a nearby node query instruction to another device.

For example, the query instruction may include a personal area network security key, priority information of the master interface device, and/or identity information of the master interface device. The priority information of the master interface device may include information indicating that a priority of the master interface device is higher.

Accordingly, the another device receives the query instruction from the master interface device.

S1002: The another device initiates a random access process to a device with a higher priority.

For example, the another device may initiate the random access process to the device with the higher priority (for example, the master interface device) based on different content in the query message.

In an implementation, when the query instruction sent by the master interface device includes information indicating that the master interface device is a master node, a process in which the another device sends a random access request to the master interface device according to the query instruction may be as follows: The another device receives the query instruction, and when the another device determines, based on the information indicating that the master interface device is a master node, that the priority of the master interface device is higher than that of the another device, or determines that the priority of the master interface device is higher than a threshold, the another device initiates the random access request to the master interface device.

In another implementation, when the query instruction sent by the master interface device includes a security key parameter, a process in which the another device sends a random access request to the master interface device according to the query instruction may be as follows: The another device receives the query instruction, the another device performs calculation based on the security key parameter, and when a calculation result for the security key parameter is consistent with that stored in the another device, the another device initiates the random access request to the master interface device.

The random access request may also include device information of a third device. The third device may be a device that uses the another device as a master node. For example, the master interface device may obtain device information of the another device. The another device may serve as a master node of the third device, and has obtained the device information of the third device. Therefore, when the another device sends the random access request to the master interface device according to the query instruction, the random access request may include the device information of the another device and/or the device information of the third device.

Figure 11:
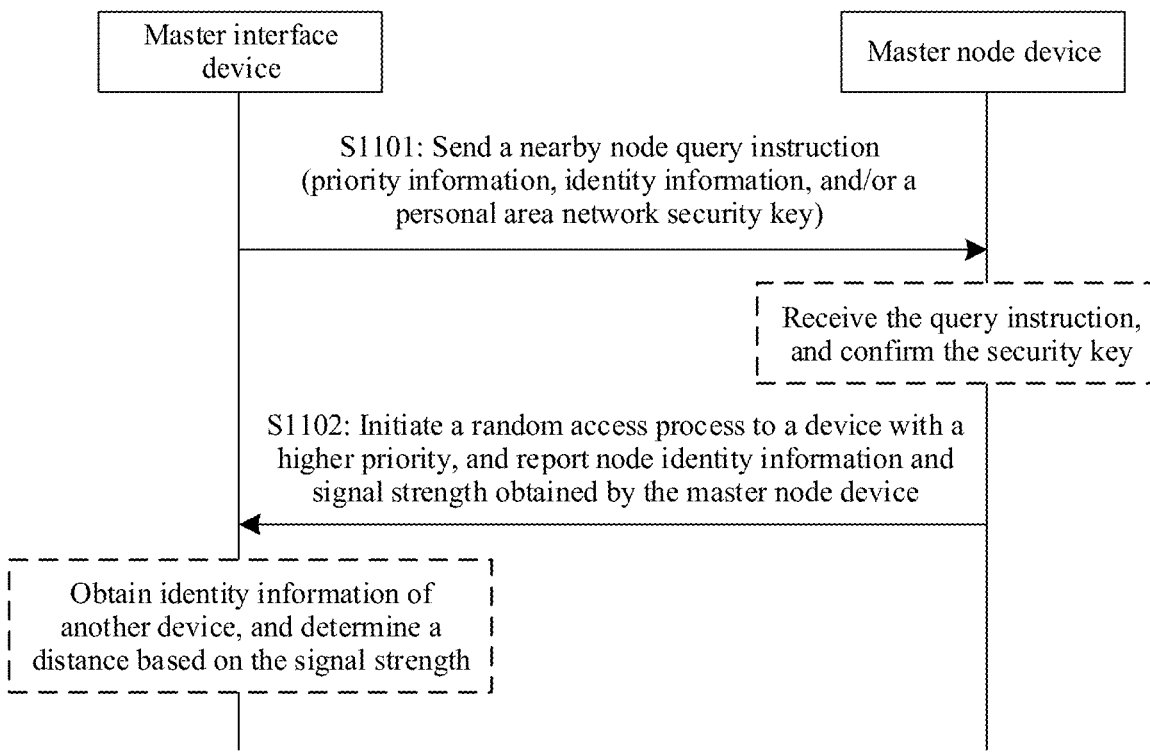
FIG. 11 is another schematic flowchart of obtaining device information according to an embodiment of this application.

For example, a process of obtaining the device information of the second device based on the random access request is described by using an example in which the first device is a master interface device and a device that is in the second device and that serves as a master node of the third device is a master node device. FIG. 11 is another schematic flowchart of obtaining device information according to an embodiment of this application. As shown in FIG. 11, a process of obtaining the device information may include the following operations.

S1101: A master interface device sends a nearby node query instruction to a master node device.

S1102: The master node device initiates a random access process to a device with a higher priority, and reports node identity information and signal strength obtained by the master node device.

The random access request includes identity information and signal strength of a third device. The third device is a device that uses the second device as a master node.

A process in which the master node device initiates the random access process to the device with the higher priority in S1102 is similar to the process in which the another device initiates the random access process to the device with the higher priority in operation S1002, and details are not described herein again.

In the embodiments corresponding to FIG. 10 and FIG. 11, In some embodiments, the master interface device may obtain distances/a distance between the master interface device and the another device and/or the third device based on signal strength of the another device and/or the third device obtained from the random access request, or obtain orientations/an orientation of the another device and/or the third device based on location information of the another device and/or the third device obtained from the random access request.

Figure 12:
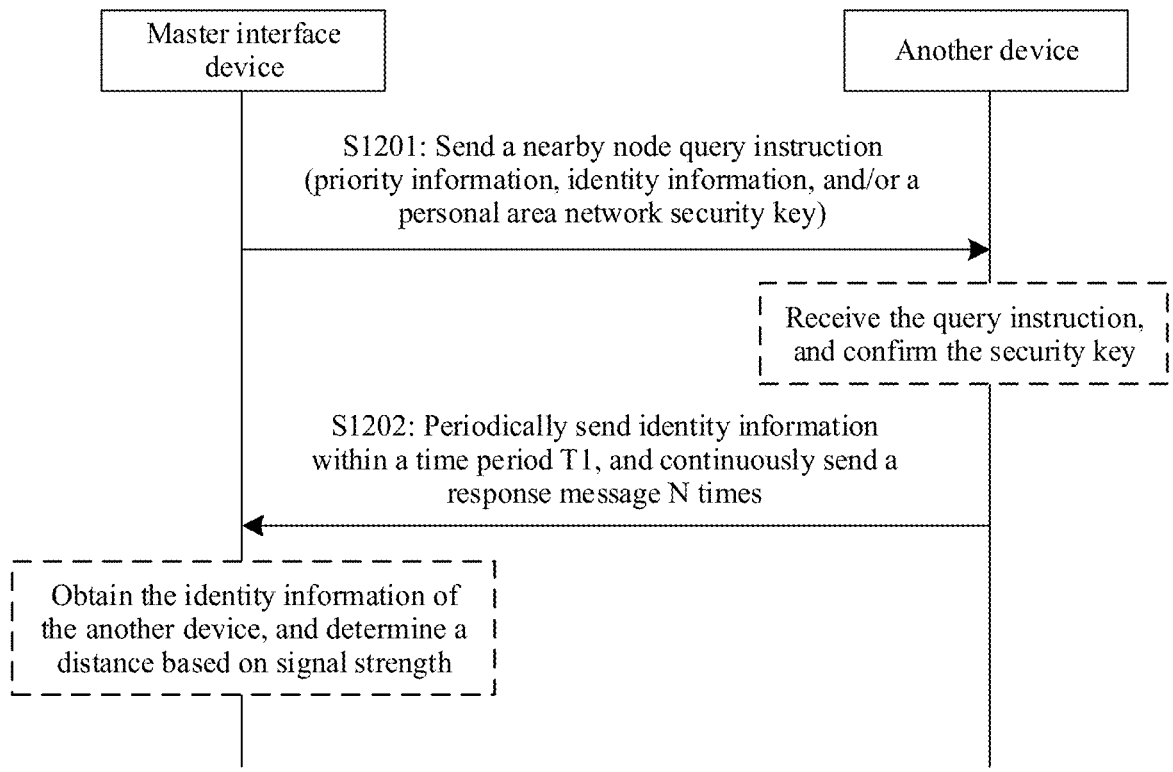
FIG. 12 is another schematic flowchart of obtaining device information according to an embodiment of this application.

Manner B: The device information of the second device is carried in the response message. For example, an example in which the first device is a master interface device and the second device is another device is used to describe a process in which the first device obtains the device information of the second device based on the response message. FIG. 12 is another schematic flowchart of obtaining device information according to an embodiment of this application. As shown in FIG. 12, a process of obtaining the device information may include the following operations.

S1201: A master interface device sends a nearby node query instruction to another device.

S1202: The another device periodically sends identity information within a time period Ti, and continuously sends a response message N times. The response message includes identity information of the another device.

For example, the another device may send the response message to a device with a higher priority (for example, the master interface device) based on different content in the query message.

In an implementation, when the query instruction sent by the master interface device includes information indicating that the master interface device is a master node, a process in which the another device sends the response message to the master interface device according to the query instruction may be as follows: The another device receives the query instruction, and when the another device determines, based on the information indicating that the master interface device is a master node, that the priority of the master interface device is higher than that of the another device, or determines that the priority of the master interface device is higher than a threshold, the another device sends the response message to the master interface device.

In another implementation, when the query instruction sent by the master interface device includes a security key parameter, a process in which the another device sends the response message to the master interface device according to the query instruction may be as follows: The another device receives the query instruction, the another device performs calculation based on the security key parameter, and when a calculation result for the security key parameter is consistent with that stored in the another device, the another device sends the response message to the master interface device.

The response message may also include device information of a third device. A process of obtaining the device information of the third device is not described herein again.

In some embodiments, the master interface device may obtain distances/a distance between the master interface device and the another device and/or the third device based on signal strength of the another device and/or the third device obtained from the response message, or obtain orientations/an orientation of the another device and/or the third device based on location information of the another device and/or the third device obtained from the response message.

Other than the foregoing method for obtaining the device information of the second device by the first device in Manner 1 or Manner 2, in some embodiments, the first device may alternatively obtain the device information of the second device based on a broadcast message sent by the second device.

Figure 13:
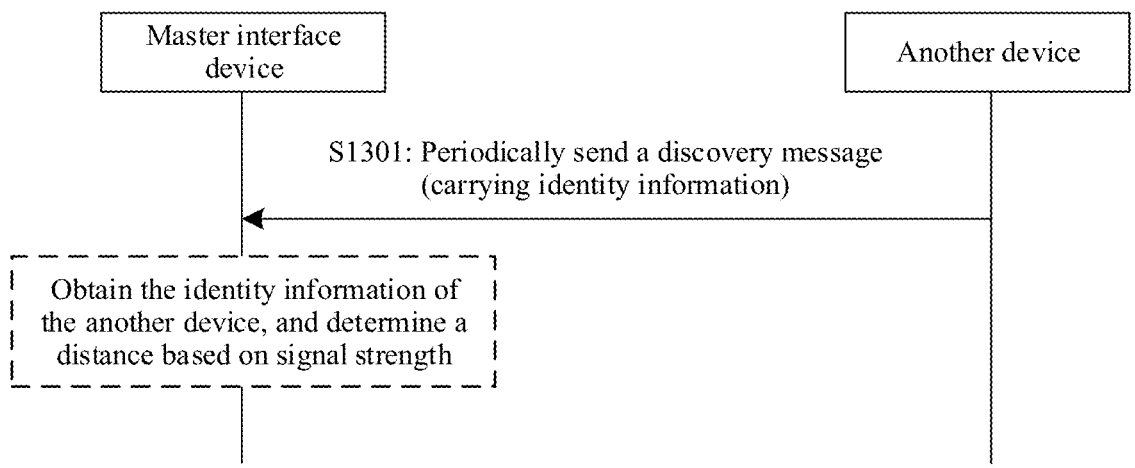
FIG. 13 is another schematic flowchart of obtaining device information according to an embodiment of this application.

For example, an example in which the first device is a master interface device and the second device is another device is used to describe a process in which the first device obtains the device information of the second device. FIG. 13 is another schematic flowchart of obtaining device information according to an embodiment of this application. As shown in FIG. 13, a process of obtaining the device information may include the following operations.

S1301: Another device periodically sends a discovery message to a master interface device.

The discovery message may be a broadcast message, and the discovery message may carry identity information of the another device. Accordingly, the master interface device may obtain device information of the another device that is sent by the another device. The device information is, for example, the identity information.

The broadcast message may also include device information of a third device. A process of obtaining the device information of the third device is not described herein again.

In some embodiments, the master interface device may obtain distances/a distance between the master interface device and the another device and/or the third device based on signal strength of the another device and/or the third device obtained from the broadcast message, or obtain orientations/an orientation of the another device and/or the third device based on location information of the another device and/or the third device obtained from the broadcast message.

Based on this, the first device may obtain the device information of the second device based on the random access request, the response message, the broadcast message, or the like, and may further generate, based on different device information of devices, topology information corresponding to the device information of the devices.

Based on the embodiment corresponding to FIG. 5, in some embodiments, the method further includes topology information transfer and diffusion, based on the received second topology information, the at least one second device establishes the connection relationship between the at least one second device and the first device, or establishes the connection relationship between the at least one second device.

There may be two manners of topology information transfer and diffusion. Manner a: Topology information transfer and diffusion are implemented based on a broadcast message and a random access request (as shown in an embodiment corresponding to FIG. 14 and FIG. 15). Manner b: Topology information transfer and diffusion are implemented based on a broadcast message (as shown in an embodiment corresponding to FIG. 16).

Figure 14:
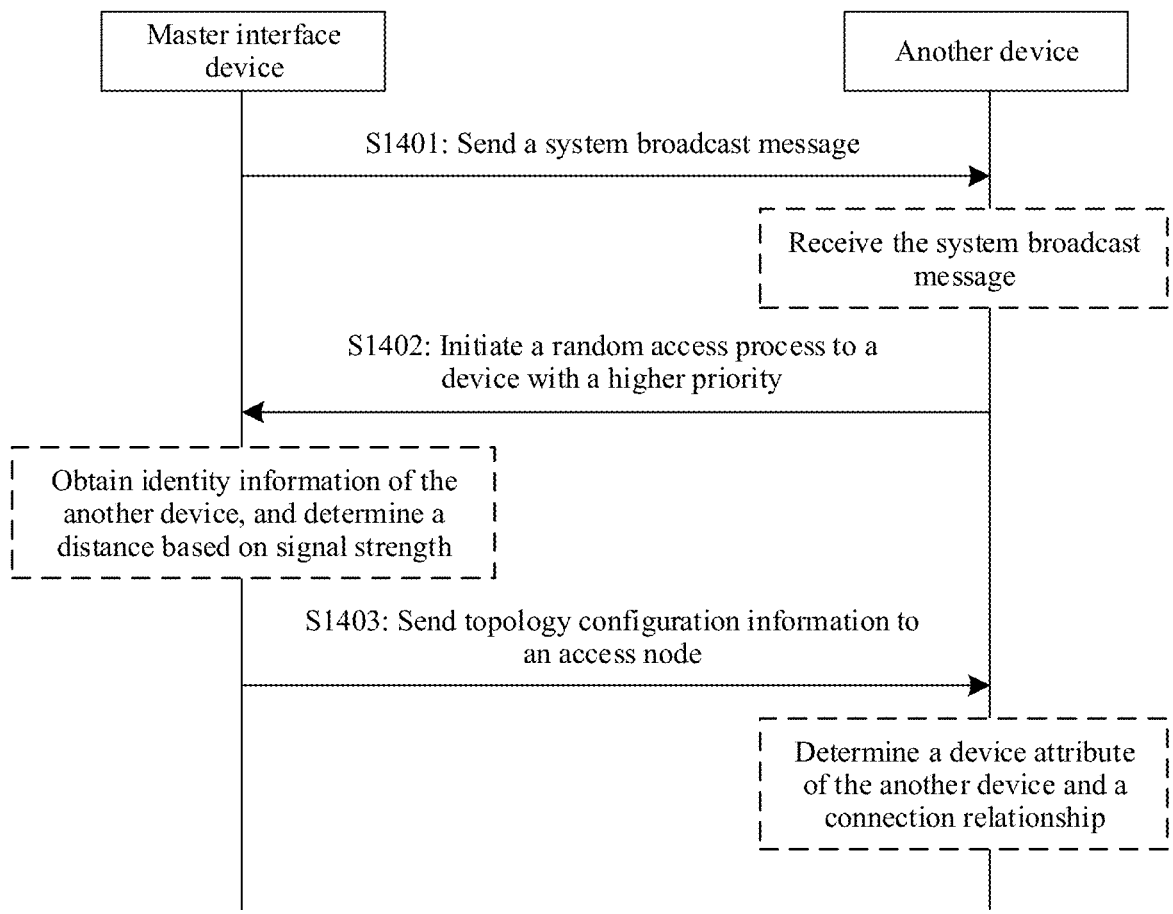
FIG. 14 is a schematic flowchart of topology information transfer and diffusion according to an embodiment of this application.

Manner a: Topology information transfer and diffusion are implemented based on a broadcast message and a random access request. For example, a topology information transfer and diffusion process is described by using an example in which the first device is a master interface device, the second device is another device, and the second topology information is topology configuration information. FIG. 14 is a schematic flowchart of topology information transfer and diffusion according to an embodiment of this application. As shown in FIG. 14, the topology information transfer process may include the following operations.

S1401: A master interface device sends a system broadcast message to another device.

The broadcast message includes priority information of the master interface device and/or topology configuration information. The priority information of the master interface device may include information indicating that a priority of the master interface device is higher.

S1402: The another device initiates a random access process to a device with a higher priority.

For example, when the broadcast message sent by the master interface device includes information indicating that the master interface device is a master node, a process in which the another device sends a random access request to the master interface device based on the broadcast message may be as follows: The another device receives the broadcast message, and when the another device determines that the master interface device is a master node, the another device initiates the random access request to the master interface device.

In some embodiments, when the broadcast message sent by the master interface device includes the topology configuration information, the another device may obtain the topology configuration information from the master interface device.

In some embodiments, the master interface device may determine a distance based on signal strength obtained from the random access request.

S1403: The master interface device sends the topology configuration information to an access node.

The access node may include the another device. The another device may determine an attribute of the another device and a connection relationship between the another device and each device based on the topology configuration information.

In some embodiments, the first device may also transfer the topology information to the second device and/or the third device. Details are not described herein again.

Figure 15:
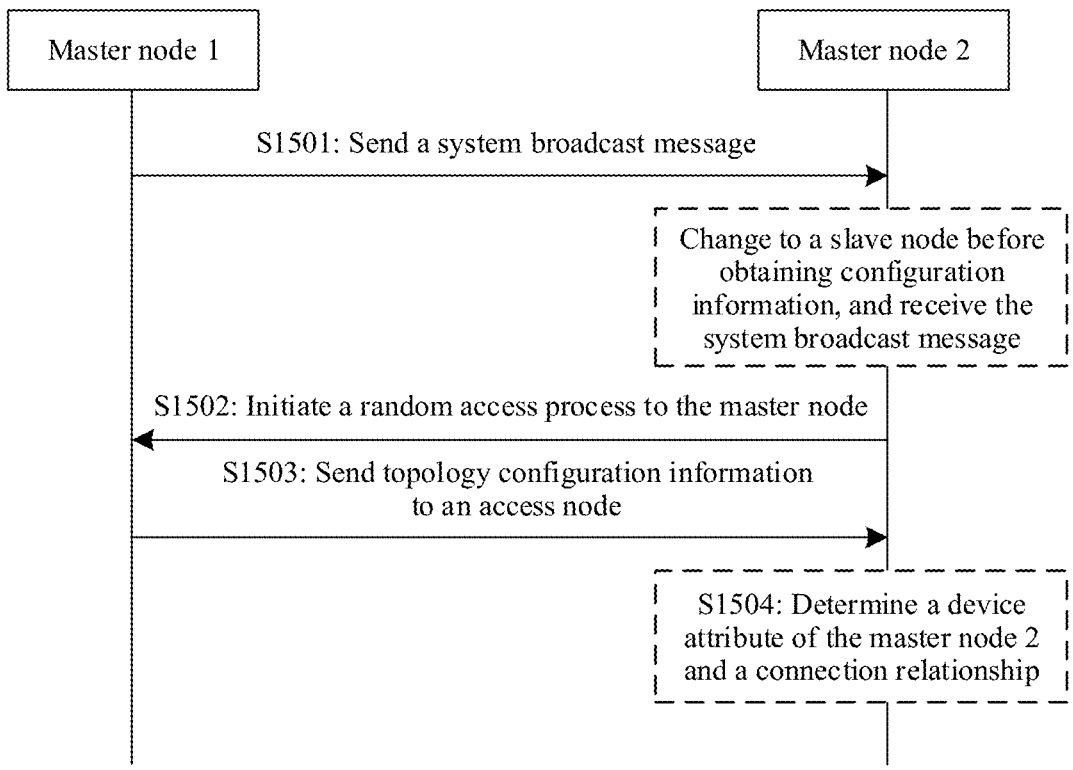
FIG. 15 is another schematic flowchart of topology information transfer and diffusion according to an embodiment of this application.

For example, a topology information transfer and diffusion process is described by using an example in which the first device is a master node 1, a master node 2 is a master node of the first device, and the topology information is topology configuration information. FIG. 15 is another schematic flowchart of topology information transfer and diffusion according to an embodiment of this application. As shown in FIG. 15, the topology information transfer process may include the following operations.

S1501: A master node 1 sends a system broadcast message to a master node 2.

Before obtaining configuration information, the master node 2 may become a slave node and receive the system broadcast message.

S1502: The master node 2 initiates a random access process to a master node.

The master node includes the master node 1.

S1503: The master node 1 sends topology configuration information to an access node.

The access node includes the master node 2. Accordingly, the master node 2 may determine an attribute of the master node 2 and a connection relationship between the master node 2 and each device based on the topology configuration information.

Figure 16:
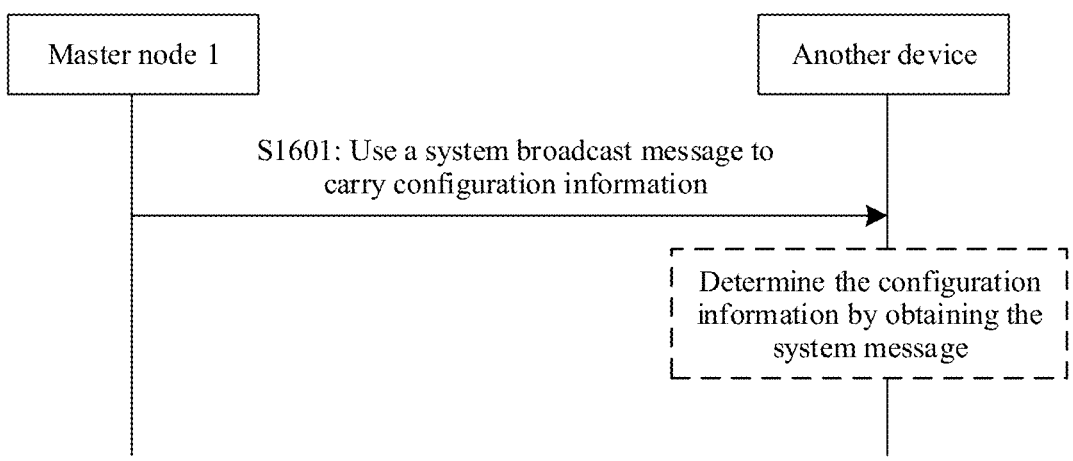
FIG. 16 is another schematic flowchart of topology information transfer and diffusion according to an embodiment of this application.

Manner b: Topology information transfer and diffusion are implemented based on a broadcast message. For example, a topology information transfer and diffusion process is described by using an example in which the first device or the second device is a master node and the topology information is topology configuration information. FIG. 16 is another schematic flowchart of topology information transfer and diffusion according to an embodiment of this application. As shown in FIG. 16, the topology information transfer process may include the following operations.

S1601: A master node 1 sends a system broadcast message to another device.

The system broadcast message may include configuration information and the like. Accordingly, the another device may obtain the configuration information by using the system broadcast message, and then establish a connection between devices.

Based on this, a connection configuration relationship between a plurality of devices may be established based on topology information generated by using different device information. This can resolve a cumbersome process of performing one-to-one device configuration in an existing manner, and simplify a connection configuration process between a plurality of devices, and the method is simple and efficient.

It may be understood that the schematic interface diagram provided in embodiments of this application is merely an example, and cannot be used as a limitation on embodiments of this application.

The foregoing describes the method provided in embodiments of this application with reference to FIG. 5 to FIG. 16. The following describes an apparatus for performing the method in embodiments of this application.

Figure 17:
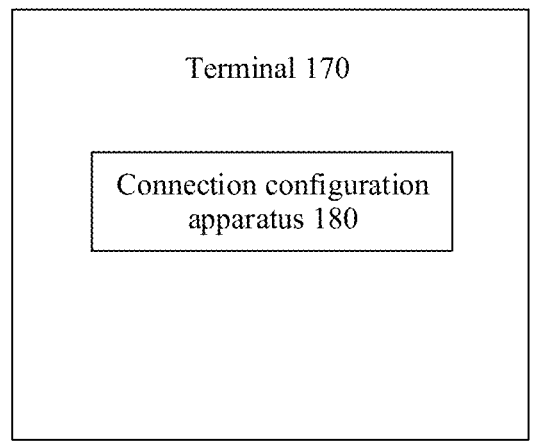
FIG. 17 is a schematic diagram of a structure of a terminal according to an embodiment of this application.

For example, FIG. 17 is a schematic diagram of a structure of a terminal according to an embodiment of this application. As shown in FIG. 17, the terminal 170 includes a connection configuration apparatus 180. It may be understood that another component or another apparatus included in the terminal may be specified according to an actual application scenario. This is not limited in this embodiment of this application.

In this embodiment of this application, the terminal may perform, by using the connection configuration apparatus 180, the method described in the foregoing embodiments. It may be understood that an implementation in which the terminal controls the connection configuration apparatus 180 may be specified according to an actual application scenario. This is not limited in this embodiment of this application.

Figure 18:
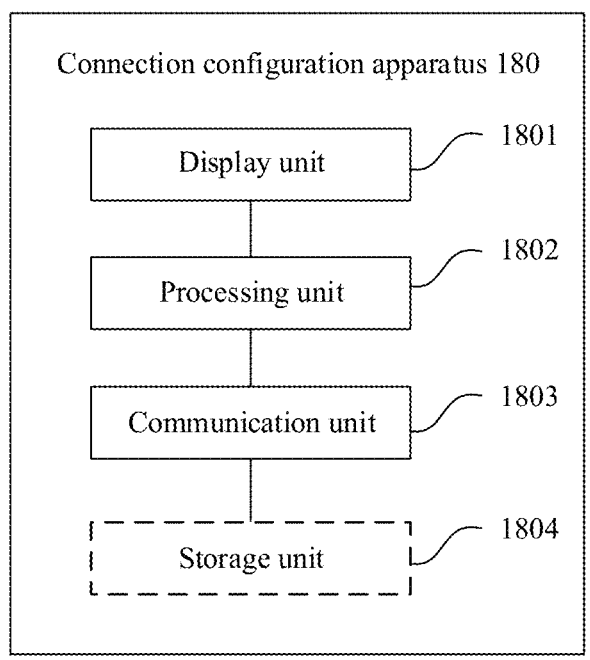
FIG. 18 is a schematic diagram of a structure of a connection configuration apparatus according to an embodiment of this application.

Based on the terminal shown in FIG. 17, to better describe the connection configuration apparatus 180, for example, FIG. 18 is a schematic diagram of a structure of a connection configuration apparatus according to an embodiment of this application. As shown in FIG. 18, the connection configuration apparatus 180 may be used in a communication device, a circuit, a hardware component, or a chip. The connection configuration apparatus includes at least one of a display unit 1801, a processor 1802, and a communication processor 1803. The display unit 1801 is configured to support the connection configuration apparatus in performing a display operation. The processor 1802 is configured to support the connection configuration apparatus in performing an information processing operation. The communication processor 1803 is configured to support the connection configuration apparatus in performing a data sending or receiving operation. The connection configuration apparatus 180 may be a first device or a second device in embodiments of this application.

, when the connection configuration apparatus 180 is a first device, the connection configuration apparatus 180 provided in this embodiment of this application includes the processor 1802, configured to obtain device information of at least one second device. The processor 1802 is further configured to generate first topology information based on the device information of the at least one second device, where the first topology information indicates a connection relationship between a first device and the at least one second device or a connection relationship between the at least one second device, and the connection relationship indicates a priority of a device and/or a master-slave relationship between devices.

In some embodiments, the connection relationship is related to at least one service.

In some embodiments, the processor 1802 is configured to generate the topology information based on input information from a user, where the input information includes drawing information or configuration information, the drawing information is obtained based on a drawing operation from the user on a connection line between the first device and the at least one second device or a connection line between the at least one second device, and the configuration information is obtained based on a configuration operation from the user on an attribute of the first device and the at least one second device or an attribute of the at least one second device.

In some embodiments, the communication processor 1803 is configured to output at least one piece of prompt information; and the processor 1802 is configured to generate the topology information based on information in response to the prompt information, where the information in response to the prompt information is from a user and is used to establish the connection relationship between the first device and the at least one second device or establish the connection relationship between the at least one second device.

In some embodiments, the processor 1802 is configured to generate the topology information in response to a location change of a device identifier displayed in an interface, where the device identifier is used to identify a device.

In some embodiments, the display unit 1801 is configured to display a topology structure, where the topology structure includes the connection relationship.

In some embodiments, the topology structure further includes a relative distance and/or a relative orientation between devices; and a length of a connection line used to reflect the connection relationship is positively correlated with the relative distance, and/or a parameter of a distance between the devices corresponding to the connection relationship is marked on the connection line used to reflect the connection relationship.

In some embodiments, the communication processor 1803 is configured to: send a query request, where the query request includes identity information of the first device; and receive the device information from the at least one second device, where the identity information of the first device is used to identify the first device.

In some embodiments, the device information of the second device is carried in a random access request or a response message.

In some embodiments, the device information includes one or more of the following: a device identifier, identity information, a device hardware address, or a device domain name.

In some embodiments, the query request further includes one or more of the following: a security key parameter or information indicating that the first device is a master node.

, when the connection configuration apparatus 180 is a second device, the connection configuration apparatus 180 provided in this embodiment of this application includes the communication processor 1803, configured to send device information of the second device. The communication processor 1803 is further configured to receive second topology information from a first device, where the second topology information includes or indicates a connection relationship between the first device and at least one second device or a connection relationship between at least one second device, and the connection relationship indicates a priority of a device and/or a master-slave relationship between devices.

In some embodiments, the communication processor 1803 is configured to: receive a query request from the first device, where the query request includes identity information of the first device; and send the device information of the second device to the first device based on the query request.

In some embodiments, the device information of the second device is carried in a random access request or a response message.

In some embodiments, the device information includes one or more of the following: a device identifier, identity information, a device hardware address, or a device domain name.

In some embodiments, the query request further includes one or more of the following: a security key parameter or information indicating that the first device is a master node.

It may be understood that the connection configuration apparatus 180 in the foregoing solutions has a function of implementing corresponding operations performed by the first device or the second device in the foregoing methods.

In some embodiments, the connection configuration apparatus 180 may further include a storage unit 1804. The processor 1802 and the storage unit 1804 are connected to each other through a communication line.

The storage unit 1804 may include one or more memories, and the memory may be a component configured to store a program or data in one or more devices or circuits.

The storage unit 1804 may exist independently, and is connected to the processor 1802 of the connection configuration apparatus by using a communication line. The storage unit 1804 may alternatively be integrated with the processor 1802.

The communication processor 1803 may be an input/output interface, a pin, a circuit, or the like. For example, the storage unit 1804 may store computer-executable instructions of a method of a radar or a target device, so that the processor 1802 performs the method of the radar or the target device in the foregoing embodiments. The storage unit 1804 may be a register, a cache, a RAM, or the like, and the storage unit 1804 may be integrated with the processor 1802. The storage unit 1804 may be a ROM or another type of static storage device that can store static information and instructions, and the storage unit 1804 may be independent of the processor 1802.

Figure 19:
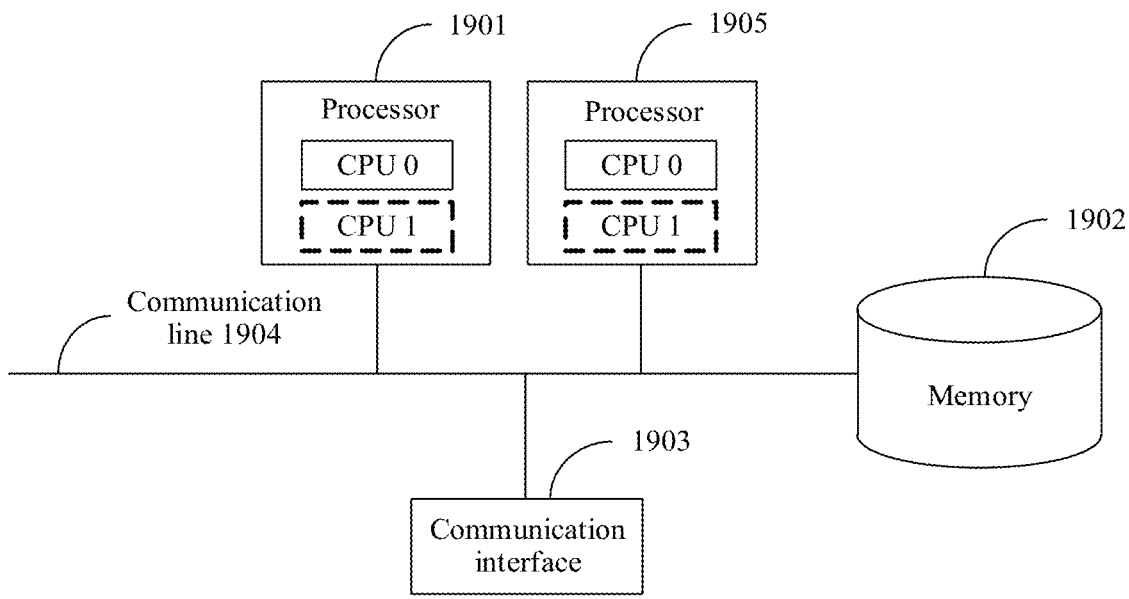
FIG. 19 is a schematic diagram of a hardware structure of a control device according to an embodiment of this application.

For example, FIG. 19 is a schematic diagram of a hardware structure of a control device according to an embodiment of this application. As shown in FIG. 19, the control device includes a processor 1901, a communication line 1904, and at least one communication interface (a communication interface 1903 is used as an example for description in FIG. 19).

The processor 1901 may be a general-purpose central processor (CPU), a microprocessor, an application-specific integrated circuit (ASIC), or one or more integrated circuits configured to control program execution in the solutions of this application.

The communication line 1904 may include a circuit for transmitting information between the foregoing components.

The communication interface 1903 is configured to communicate with another device or a communication network such as the Ethernet or a wireless local area network (WLAN) by using any apparatus in a type of a transceiver.

In some embodiments, the control device may further include a memory 1902.

The memory 1902 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. However, this is not limited. The memory may exist independently, and is connected to the processor through the communication line 1904. The memory may alternatively be integrated with the processor.

The memory 1902 is configured to store computer-executable instructions for performing the solutions in this application, and the processor 1901 controls execution. The processor 1901 is configured to execute the computer-executable instructions stored in the memory 1902, to implement the connection configuration method provided in embodiments of this application.

In some embodiments, the computer-executable instructions in this embodiment of this application may also be referred to as application program code. This is not limited in this embodiment of this application.

In an embodiment, the processor 1901 may include one or more CPUs, for example, a CPU 0 and a CPU 1 in FIG. 19.

In an embodiment, the control device may include a plurality of processors, for example, the processor 1901 and a processor 1905 in FIG. 19. Each of these processors may be a single-core (single-CPU) processor, or may be a multi-core (multi-CPU) processor. The processor herein may be one or more devices, circuits, and/or processing cores configured to process data (for example, computer program instructions).

In an embodiment, the processor 1901 is configured to read a program in the memory 1902, to perform the method procedure in S501 to S503 shown in FIG. 5.

Figure 20:
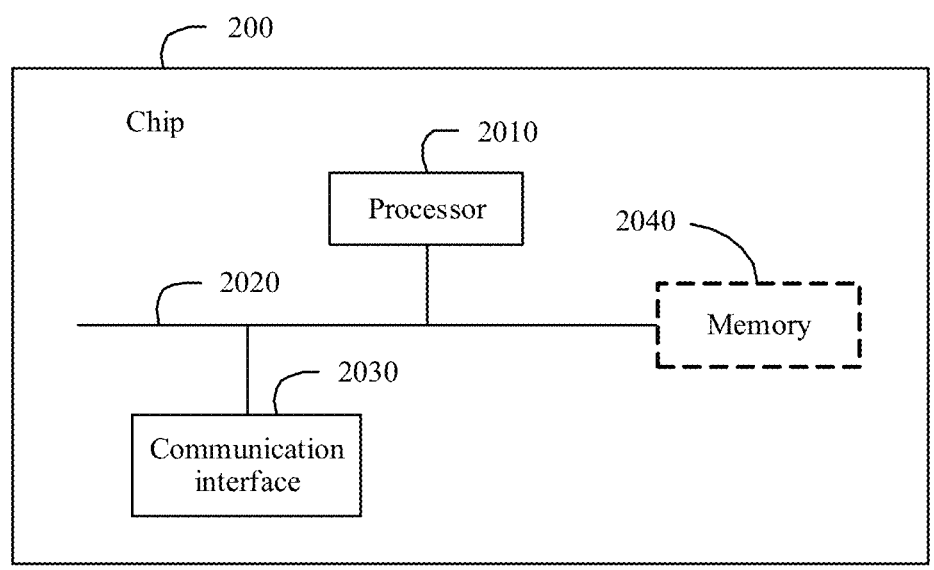
FIG. 20 is a schematic diagram of a structure of a chip according to an embodiment of this application.

For example, FIG. 20 is a schematic diagram of a structure of a chip according to an embodiment of this application. The chip 200 includes one or more (including two) processors 2010 and a communication interface 2030.

In some implementations, a memory 2040 stores the following element: an executable module or a data structure, a subset thereof, or an extension set thereof.

In this embodiment of this application, the memory 2040 may include a read-only memory and a random access memory, and provides instructions and data for the processor 2010. A part of the memory 2040 may further include a non-volatile random access memory (NVRAM).

In this embodiment of this application, the processor 2010, the communication interface 2030, and the memory 2040 are coupled together by using a bus system 2020. In addition to a data bus, the bus system 2020 may further include a power bus, a control bus, a status signal bus, and the like. For ease of description, various buses are marked as the bus system 2020 in FIG.

The method described in embodiments of this application may be applied to the processor 2010, or implemented by the processor 2010. The processor 2010 may be an integrated circuit chip, and has a signal processing capability. In an implementation process, operations of the foregoing method may be completed by using an integrated logic circuit of hardware in the processor 2010 or an instruction in a form of software. The processor 2010 may be a general-purpose processor (for example, a microprocessor or a conventional processor), a digital signal processor (DSP), an application-specific integrated circuit (ASIC), a field-programmable gate array (FPGA) or another programmable logic device, a discrete gate, a transistor logic device, or a discrete hardware component. The processor 2010 may implement or perform the methods, operations, and logical block diagrams disclosed in embodiments of the present disclosure.

The operations of the methods disclosed with reference to embodiments of this application may be directly performed by a hardware decoding processor, or performed by a combination of hardware and software modules in the decoding processor. The software module may be located in a mature storage medium in the art such as a random access memory, a read-only memory, a programmable read-only memory, or an electrically erasable programmable read-only memory (EEPROM). The storage medium is located in the memory 2040. The processor 2010 reads information in the memory 2040, and completes the operations of the foregoing methods in combination with hardware of the processor 2010.

In the foregoing embodiment, the instructions stored in the memory for execution by the processor may be implemented in a form of a computer program product. The computer program product may be written in the memory in advance, or may be downloaded and installed in the memory in a form of software.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. For example, the usable medium may include a magnetic medium (for example, a floppy disk, a hard disk, or a magnetic tape), an optical medium (for example, a digital versatile disc (DVD)), or a semiconductor medium (for example, a solid state disk (SSD)).

An embodiment of this application further provides a computer-readable storage medium. All or some of the methods described in the foregoing embodiments may be implemented by software, hardware, firmware, or any combination thereof. The computer-readable medium may include a computer storage medium and a communication medium, and may further include any medium that can transmit a computer program from one place to another. The storage medium may be any target medium accessible by a computer.

In some embodiments, the computer-readable medium may include a compact disc read-only memory (CD-ROM), a RAM, a ROM, an EEPROM, or another optical disk memory. The computer-readable medium may include a magnetic disk memory or another magnetic disk storage device. In addition, any connection line may be appropriately referred to as a computer-readable medium. For example, if a coaxial cable, an optical fiber cable, a twisted pair, a DSL, or a wireless technology (such as infrared, radio, and microwave) is used to transmit software from a website, a server, or another remote source, the coaxial cable, the optical fiber cable, the twisted pair, the DSL, or the wireless technology such as infrared, radio, and microwave is included in the definition of media. As used herein, a magnetic disk and an optical disk include an optical disc (CD), a laser disc, an optical disk, a digital versatile disc (DVD), a floppy disk, and a Blu-ray disc. The magnetic disk usually reproduces data in a magnetic manner, and the optical disk reproduces data optically by using a laser.

The foregoing combination should also be included in the scope of the computer-readable medium. The foregoing descriptions are merely embodiments of the present disclosure. However, the protection scope of the present disclosure is not limited thereto. Any change or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A connection configuration method, comprising:
    obtaining device information of at least one second device;
    generating topology information based on the device information, wherein the topology information indicates a connection relationship between a first device and the at least one second device or, when the at least one second device comprises at least two second devices, a connection relationship between the at least two second devices,
    wherein the connection relationship indicates a priority of a device and/or a master-slave relationship between the first device and the at least one second device or between the at least two second devices; and
    displaying a topology structure, corresponding to the connection relationship, that comprises a relative distance between the first device and the at least one second device or between the at least two second devices, wherein a length of a connection line used to reflect the connection relationship is positively correlated with the relative distance.

2. The method according to claim 1, wherein the connection relationship is related to at least one service.

3. The method according to claim 1, further comprising:
    generating the topology information based on input information from a user, wherein
    the input information comprises drawing information or configuration information, the drawing information is obtained based on a drawing operation from the user on the connection line between the first device and the at least one second device or the connection line between the at least two second devices, and the configuration information is obtained based on a configuration operation from the user on an attribute of the first device and the at least one second device or an attribute of the at least one second device.

4. The method according to claim 1, further comprising:
    outputting at least one piece of prompt information; and
    generating the topology information based on information in response to the prompt information, wherein
    the information in response to the prompt information is from a user and is used to establish the connection relationship between the first device and the at least one second device or establish the connection relationship between the at least two second devices.

5. The method according to claim 1, further comprising:
    generating the topology information in response to a location change of a device identifier displayed in an interface, wherein the device identifier is used to identify a device.

6. The method according to claim 1, wherein the topology structure further comprises a relative orientation between devices; and
    a parameter of a distance between the devices corresponding to the connection relationship is marked on the connection line used to reflect the connection relationship.

7. The method according to claim 1, further comprising:
    sending a query request, wherein the query request comprises identity information of the first device; and
    receiving the device information from the at least one second device, wherein
    the identity information of the first device is used to identify the first device.

8. The method according to claim 7, wherein the device information of the second device is carried in a random access request or a response message.

9. The method according to claim 1, wherein the device information comprises one or more of the following: a device identifier, identity information, a device hardware address, or a device domain name.

10. The method according to claim 7, wherein the query request further comprises one or more of the following: a security key parameter or information indicating that the first device is a master node.

11. A connection configuration apparatus, comprising:
    a processor, configured to:
        obtain device information of at least one second device;
        generate topology information based on the device information of the at least one second device, wherein the topology information indicates a connection relationship between a first device and the at least one second device or, when the at least one second device comprises at least two second devices, a connection relationship between the at least two second devices, wherein the connection relationship indicates a priority of a device and/or a master-slave relationship between the first device and the at least one second device or between the at least two second devices; and display a topology structure, corresponding to the connection relationship, that comprises a relative distance between the first device and the at least one second device or between the at least two second devices, wherein a length of a connection line used to reflect the connection relationship is positively correlated with the relative distance.

12. The apparatus according to claim 11, wherein the connection relationship is related to at least one service.

13. The apparatus according to claim 11, wherein the processor is configured to:

generate the topology information based on input information from a user, wherein the input information comprises drawing information or configuration information, the drawing information is obtained based on a drawing operation from the user on the connection line between the first device and the at least one second device or the connection line between the at least two second devices, and the configuration information is obtained based on a configuration operation from the user on an attribute of the first device and the at least one second device or an attribute of the at least one second device.

14. The apparatus according to claim 11, wherein the apparatus further comprises:

a communication processor, configured to:

output at least one piece of prompt information; and the processor is configured to:

generate the topology information based on information in response to the prompt information, wherein the information in response to the prompt information is from a user and is used to establish the connection relationship between the first device and the at least one second device or establish the connection relationship between the at least two second devices.

15. The apparatus according to claim 11, wherein the processor is configured to:

generate the topology information in response to a location change of a device identifier displayed in an interface, wherein the device identifier is used to identify a device.

16. The apparatus according to claim 11, wherein the apparatus further comprises a display configured to display the topology structure comprising the connection relationship.

17. The apparatus according to claim 16, wherein the topology structure further comprises a relative orientation between devices; and a parameter of a distance between the devices corresponding to the connection relationship is marked on the connection line used to reflect the connection relationship.

18. The apparatus according to claim 11, wherein the processor is configured to:

send a query request, wherein the query request comprises identity information of the first device; and receive the device information from the at least one second device, wherein the identity information of the first device is used to identify the first device.

19. A non-transitory computer-readable storage medium, having instructions stored thereon which, when executed by a processing device, cause the processing device to:

obtain device information of at least one second device;

generate topology information based on the device information of the at least one second device, wherein the topology information indicates a connection relationship between a first device and the at least one second device or, when the at least one second device comprises at least two second devices, a connection relationship between the at least two second devices, wherein the connection relationship indicates a priority of a device and/or a master-slave relationship between devices; and display a topology structure, corresponding to the connection relationship, that comprises a relative distance and/or a relative orientation between the first device and the at least one second device or between the at least two second devices, wherein a length of a connection line used to reflect the connection relationship is positively correlated with the relative distance.

* * * * *